(12) United States Patent
Hashimoto et al.

(10) Patent No.: US 11,852,251 B2
(45) Date of Patent: Dec. 26, 2023

(54) FAUCET VALVE APPARATUS

(71) Applicant: TOTO LTD., Kitakyushu (JP)

(72) Inventors: Kenichi Hashimoto, Kitakyushu (JP); Makoto Hatakeyama, Kitakyushu (JP); Masanobu Kanashiro, Kitakyushu (JP)

(73) Assignee: TOTO LTD., Kitakyushu (JP)

( * ) Notice: Subject to any disclaimer, the term of this patent is extended or adjusted under 35 U.S.C. 154(b) by 199 days.

(21) Appl. No.: 17/477,936

(22) Filed: Sep. 17, 2021

(65) Prior Publication Data
US 2022/0099198 A1 Mar. 31, 2022

(30) Foreign Application Priority Data

Sep. 29, 2020 (JP) ................................ 2020-163712
Sep. 29, 2020 (JP) ................................ 2020-163714
(Continued)

(51) Int. Cl.
*F16K 11/078* (2006.01)
*G05D 23/13* (2006.01)

(52) U.S. Cl.
CPC ........ *F16K 11/078* (2013.01); *G05D 23/1313* (2013.01)

(58) Field of Classification Search
CPC ........................... F16K 11/078; G05D 23/1313
See application file for complete search history.

(56) References Cited

U.S. PATENT DOCUMENTS 3,028,094 A * 4/1962 Burhop .............. G05D 23/1353
                                                                137/637.4
4,324,267 A * 4/1982 Bach .................... G05D 11/003
                                                                137/100
(Continued)

FOREIGN PATENT DOCUMENTS

JP          61-129970 U      8/1986
JP          H324375 A        2/1991
(Continued)

OTHER PUBLICATIONS

Japanese Office Action issued in Japanese Patent Application No. 2020-163712 dated Jun. 20, 2022.
(Continued)

*Primary Examiner* — Kevin R Barss
(74) *Attorney, Agent, or Firm* — BakerHostetler

(57) ABSTRACT

The cylinder body is affected by a rotational operation of the first operation part in such a manner that a rotational position of the cylinder body is changed while an axial position of the cylinder body is not changed, and is affected by a rotational operation of the second operation part in such a manner that the axial position of the cylinder body is changed while the rotational position of the cylinder body is not changed. A communication amount between the cold water supply channel and the cold water inlet hole, a communication amount between the hot water supply channel and the hot water inlet hole, and/or a communication amount between the mixed water outlet hole and the mixed water outlet channel are/is changed depending on the axial position and the rotational position of the cylinder body in order to achieve both a temperature regulation and a flow rate regulation.

23 Claims, 18 Drawing Sheets

(30) Foreign Application Priority Data

Sep. 29, 2020 (JP) ................................. 2020-163715
Sep. 29, 2020 (JP) ................................. 2020-163716

(56) References Cited

U.S. PATENT DOCUMENTS

| | | | | |
|---|---|---|---|---|
| 4,381,073 | A * | 4/1983 | Gloor | G05D 23/1353 |
| | | | | 236/12.15 |
| 5,524,668 | A * | 6/1996 | Matsuo | F16K 11/207 |
| | | | | 137/454.2 |
| 5,730,167 | A * | 3/1998 | Enoki | F16K 11/07 |
| | | | | 137/15.02 |
| 6,309,096 | B1 * | 10/2001 | Chang | G05D 11/03 |
| | | | | 366/280 |
| 8,353,462 | B2 * | 1/2013 | Todaka | F16K 31/003 |
| | | | | 236/102 |
| 10,378,674 | B2 * | 8/2019 | Hanazono | E03C 1/04 |
| 2018/0119836 | A1 | 5/2018 | Ozeki et al. | |
| 2019/0243395 | A1 * | 8/2019 | Chang | G05D 23/1326 |

FOREIGN PATENT DOCUMENTS

| | | |
|---|---|---|
| JP | H5-272650 A | 10/1993 |
| JP | H6-331046 A | 11/1994 |
| JP | H11-22841 A | 1/1999 |
| JP | 11-325274 A | 11/1999 |
| JP | 2017-201200 A | 11/2017 |
| JP | 2018-71779 A | 5/2018 |

OTHER PUBLICATIONS

Japanese Office Action issued in Japanese Patent Application No. 2020-163714 dated Jun. 22, 2022, with English Translation.
Japanese Office Action issued in Japanese Patent Application No. 2020-163715 dated Jun. 22, 2022, with English Translation.
Japanese Office Action issued in Japanese Patent Application No. 2020-163716 dated Jun. 22, 2022, with English Translation.

* cited by examiner

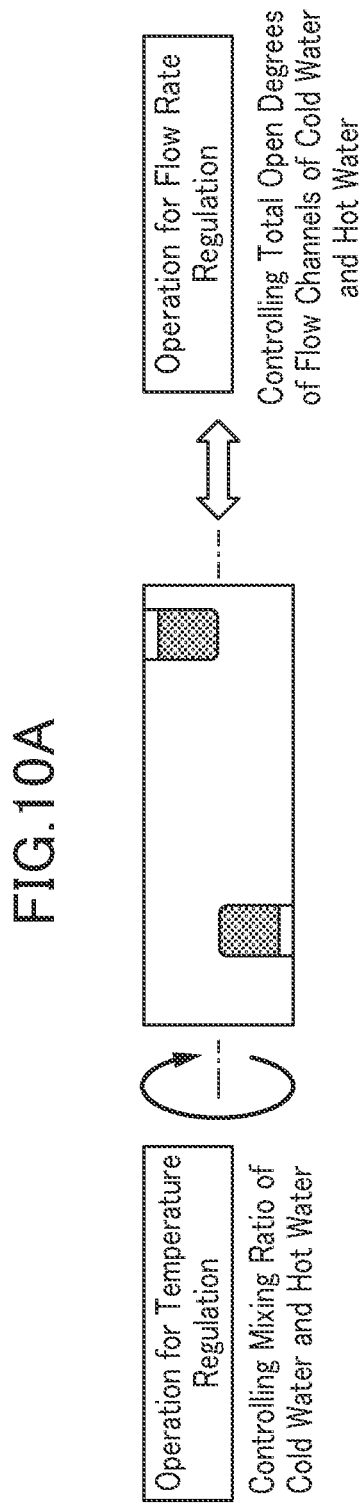

Hot Water : 0%
Cold Water :100%

Hot Water :50%
Cold Water :50%

Hot Water :100%
Cold Water : 0%

Case with Mixing Ratio of Cold Water 45 : Hot Water 55

Valve Open Degrees :100%

Valve Open Degrees :50%

Valve Open Degrees :0%

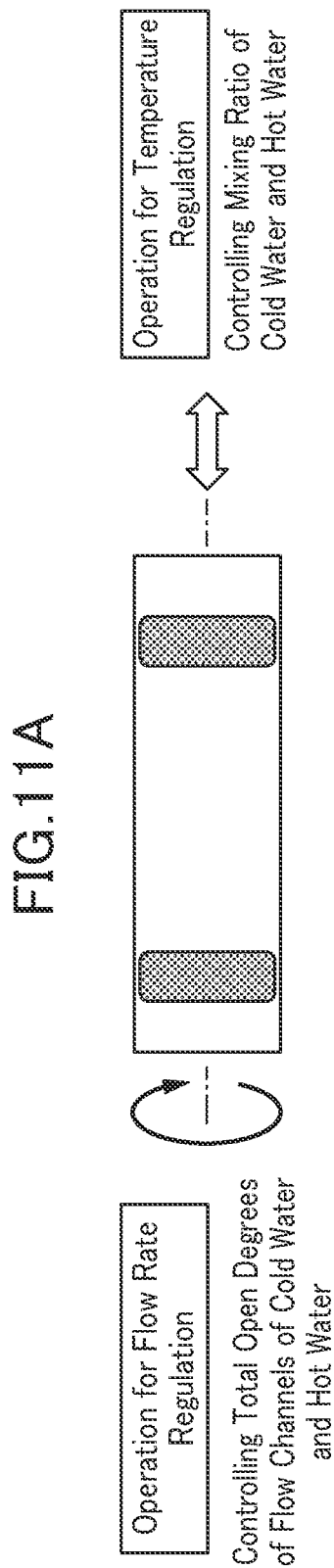

Hot Water : 0%
Cold Water :100%

Hot Water :50%
Cold Water :50%

Hot Water :100%
Cold Water : 0%

Case with Mixing Ratio of Cold Water 45 : Hot Water 55

Valve Open Degrees :100%

Valve Open Degrees :50%

Valve Open Degrees :0%

Operation for Temperature Regulation
Controlling Mixing Ratio of Cold Water and Hot Water Hot Water : 0%
Cold Water :100%

Hot Water :50%
Cold Water :50%

Hot Water :100%
Cold Water : 0%

FAUCET VALVE APPARATUS

CROSS-REFERENCE TO RELATED APPLICATION

This application claims benefit of priority to Japanese Patent Application No. 2020-163712, filed Sep. 29, 2020, Japanese Patent Application No. 2020-163714, filed Sep. 29, 2020, Japanese Patent Application No. 2020-163715, filed Sep. 29, 2020, and Japanese Patent Application No. 2020-163716, filed Sep. 29, 2020, the entire contents of which are incorporated herein by reference.

FIELD OF THE INVENTION

The present invention pertains to a faucet valve apparatus. In particular, the present invention pertains to a faucet valve apparatus suitable for achieving electrification of both a temperature regulation and a flow rate regulation. Alternatively, the present invention pertains to a faucet valve apparatus suitable for achieving electrification of a temperature regulation.

BACKGROUND OF THE INVENTION

The applicant has already achieved electrification of a flow rate regulation valve (see JP 2017-201200 A). In this flow rate regulation valve, a rotation of a stepping motor is converted into a straight movement of a pilot valve body by a lifter. JP 2017-201200 A is cited as a prior art document.

SUMMARY OF THE INVENTION

Technical Problem

However, there has been provided no faucet valve apparatus suitable for achieving electrification of both a temperature regulation and a flow rate regulation. In addition, there has been provided no faucet valve apparatus suitable for achieving electrification of a temperature regulation.

The flow rate regulation valve disclosed in JP 2017-201200 A is suitable for achieving electrification of a flow rate regulation. However, in order to achieve a temperature regulation, two of the flow rate regulation valves (for cold water and for hot water) have to be controlled independently from each other. The way of controlling them may be complicated, for example to change the temperature while the flow rate is not changed, or to change the flow rate while the temperature is not changed.

The present invention has been made under the above background. The object of the present invention is to provide a faucet valve apparatus suitable for achieving electrification of both a temperature regulation and a flow rate regulation. Alternatively, the object of the present invention is to provide a faucet valve apparatus suitable for achieving electrification of a temperature regulation.

Solution to Problem

The first aspect of the present invention is a faucet valve apparatus including: a cylinder body having a hollow cylindrical shape; a cold water inlet hole, a hot water inlet hole and a mixed water outlet hole, each of which is formed in a circumferential wall of the cylinder body; a housing body containing the cylinder body in an axially movable and rotatable manner; a cold water supply channel, a hot water supply channel and a mixed water outlet channel, each of which is communicated with an inside space of the housing body; a first operation part provided on a one side in an axial direction of the cylinder body in a rotationally operable manner; and a second operation part provided on the other side in the axial direction of the cylinder body in a rotationally operable manner; wherein the cylinder body is affected by a rotational operation of the first operation part in such a manner that a rotational position of the cylinder body is changed while an axial position of the cylinder body is not changed; the cylinder body is affected by a rotational operation of the second operation part in such a manner that the axial position of the cylinder body is changed while the rotational position of the cylinder body is not changed; and a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation.

According to the faucet valve apparatus of the first aspect, depending on the axial position and the rotational position of the common cylinder body, both a temperature regulation and a flow rate regulation can be achieved. This makes it possible to design a compact faucet valve apparatus. In addition, there is no obstacle in electrification of the first operation part and in electrification of the second operation part. That is to say, the faucet valve apparatus of the first aspect is suitable for achieving electrification of both a temperature regulation and a flow rate regulation.

In the faucet valve apparatus of the first aspect, for example, a ratio between the communication amount between the cold water supply channel and the cold water inlet hole and the communication amount between the hot water supply channel and the hot water inlet hole may be changed by a rotational operation of the first operation part in order to achieve the temperature regulation, and a total communication amount summed up by adding the communication amount between the cold water supply channel and the cold water inlet hole and the communication amount between the hot water supply channel and the hot water inlet hole may be changed by a rotational operation of the second operation part in order to achieve the flow rate regulation.

Alternatively, contrariwise, a total communication amount summed up by adding the communication amount between the cold water supply channel and the cold water inlet hole and the communication amount between the hot water supply channel and the hot water inlet hole may be changed by a rotational operation of the first operation part in order to achieve the flow rate regulation, and a ratio between the communication amount between the cold water supply channel and the cold water inlet hole and the communication amount between the hot water supply channel and the hot water inlet hole may be changed by a rotational operation of the second operation part in order to achieve the temperature regulation.

In addition, it is preferable that the first operation part and the second operation part are rotationally operable at the same time, and that when the first operation part and the second operation part are rotationally operated at the same time, the cylinder body is affected thereby in such a manner the rotational position of the cylinder body is changed while the axial position of the cylinder body is changed. According to the above feature, since the first operation part and the second operation part are operable at the same time, the temperature regulation and the flow rate regulation can be achieved more quickly.

In addition, it is preferable that the faucet valve apparatus further includes a shaft body which is affected by a rotational operation of the first operation part in such a manner that a rotational position of the shaft body is changed while an axial position of the shaft body is not changed and which is affected by a rotational operation of the second operation part in such a manner that the axial position of the shaft body is changed while the rotational position of the shaft body is not changed, and that the cylinder body is connected to the shaft body. According to the above feature, a control for changing the position of the cylinder body can be achieved by a relatively simple structure which controls the position of the shaft body.

In addition, it is preferable that the faucet valve apparatus further includes a first connection member connected to or integrated with the shaft body and fixed to the first operation part with respect to a rotational direction thereof, and that the first connection member is installed in such a manner that the first connection member is movable against the first operation part with respect to an axial direction thereof. According to the above feature, a rotational operation of the first operation part can be surely transferred as a rotating force for the shaft body, while the existence of the first connection member does not obstruct an operation of the second operation part.

In addition, it is preferable that the faucet valve apparatus further includes: a direction conversion member configured to convert a rotational operating force of the second operation part to an axial moving force; and a second connection member connected to or integrated with the shaft body and configured to receive the axial moving force converted by the direction conversion member, and that the shaft body is installed in a rotatable manner with respect to the second connection member. According to the above feature, a rotational operation of the second operation part can be surely transferred as an axial moving force for the shaft body, while the existence of the second connection member does not obstruct an operation of the first operation part.

In addition, it is preferable that the faucet valve apparatus further includes a regulation member capable of regulating a rotatable range of the second operation part in a desired manner. According to the above feature, a regulation of a movable range of the axial position of the cylinder body against the housing body can be achieved by a regulation of the rotatable range of the second operation part by the regulation member. Thus, even when there is variation between products of each structural element based on a manufacturing error or the like, the flow rate regulation and/or the temperature regulation can be achieved in a desired manner.

The second aspect of the present invention is a faucet valve apparatus including; a cylinder body having a hollow cylindrical shape; a cold water inlet hole, a hot water inlet hole and a mixed water outlet hole, each of which is formed in a circumferential wall of the cylinder body; a housing body containing the cylinder body in an axially movable and rotatable manner; a cold water supply channel; a hot water supply channel and a mixed water outlet channel, each of which is communicated with an inside space of the housing body; a first operation part provided on a one side in an axial direction of the cylinder body in a rotationally operable manner; a second operation part provided on the other side in the axial direction of the cylinder body in a rotationally operable manner; a shaft body connected to or integrated with the cylinder body; a first connection member connected to or integrated with the shaft body and fixed to the first operation part with respect to a rotational direction thereof; a direction conversion member configured to convert a rotational operating force of the second operation part to an axial moving force; and a second connection member connected to or integrated with the shaft body and configured to receive the axial moving force converted by the direction conversion member; wherein the first connection member is installed in such a manner that the first connection member is movable against the first operation part with respect to an axial direction thereof; the cylinder body and the shaft body are affected by a rotation of the first connection member caused by a rotational operation of the first operation part in such a manner that a rotational position of the cylinder body and the shaft body is changed; the cylinder body and the shaft body are affected by a conversion of a rotational operating force caused by a rotational operation of the second operation part into an axial moving force to be applied to the second connection member by the direction conversion member in such a manner that an axial position of the cylinder body and the shaft body is changed; and a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation.

According to the faucet valve apparatus of the second aspect, depending on the axial position and the rotational position of the common cylinder body, both a temperature regulation and a flow rate regulation can be achieved. This makes it possible to design a compact faucet valve apparatus.

In addition, according to the faucet valve apparatus of the second aspect, there is no obstacle in electrification of the first operation part and in electrification of the second operation part. That is to say, the faucet valve apparatus of the second aspect is suitable for achieving electrification of both a temperature regulation and a flow rate regulation.

In addition, the faucet valve apparatus of the second aspect includes the shaft body connected to or integrated with the cylinder body. According to this feature, a control for changing the position of the cylinder body can be achieved by a relatively simple structure which controls the position of the shaft body.

In addition, the faucet valve apparatus of the second aspect includes the first connection member connected to or integrated with the shaft body and fixed to the first operation part with respect to the rotational direction thereof, wherein the first connection member is installed in such a manner that the first connection member is movable against the first operation part with respect to the axial direction thereof. According to this feature, a rotational operation of the first operation part can be surely transferred as a rotating force for the shaft body, while the existence of the first connection member does not obstruct an operation of the second operation part.

In addition, the faucet valve apparatus of the second aspect includes: the direction conversion member configured to convert a rotational operating force of the second operation part to an axial moving force; and the second connection member connected to or integrated with the shaft body and configured to receive the axial moving force converted by the direction conversion member. According to this feature, a rotational operation of the second operation part can be surely transferred as an axial moving force for the shaft body.

It is preferable that the first connection member is configured to move in an axial direction thereof in such a manner that a relative position thereof in the axial direction to the first operation part is changed when a rotational operating force of the second operation part is converted into an axial moving force to be applied to the cylinder body and the shaft body by the direction conversion member.

In addition, it is preferable that the shaft body is configured to be rotatable together with the first connection member against the second connection member when the first connection member rotates in accordance with a rotational operation of the first operation part. According to the above feature, a rotational operation of the second operation part can be surely transferred as an axial moving force for the shaft body, while the existence of the second connection member does not obstruct an operation of the first operation part.

In the faucet valve apparatus of the second aspect, for example, a ratio between the communication amount between the cold water supply channel and the cold water inlet hole and the communication amount between the hot water supply channel and the hot water inlet hole may be changed by a rotational operation of the first operation part in order to achieve the temperature regulation, and a total communication amount summed up by adding the communication amount between the cold water supply channel and the cold water inlet hole and the communication amount between the hot water supply channel and the hot water inlet hole may be changed by a rotational operation of the second operation part in order to achieve the flow rate regulation.

Alternatively, contrariwise, the total communication amount summed up by adding the communication amount between the cold water supply channel and the cold water inlet hole and the communication amount between the hot water supply channel and the hot water inlet hole may be changed by a rotational operation of the first operation part in order to achieve the flow rate regulation, and the ratio between the communication amount between the cold water supply channel and the cold water inlet hole and the communication amount between the hot water supply channel and the hot water inlet hole may be changed by a rotational operation of the second operation part in order to achieve the temperature regulation.

In addition, it is preferable that the faucet valve apparatus of the second aspect further includes a regulation member capable of regulating a rotatable range of the second operation part in a desired manner. According to the above feature, a regulation of a movable range of the axial position of the shaft body and the cylinder body against the housing body can be achieved by a regulation of the rotatable range of the second operation part by the regulation member. Thus, even when there is variation between products of each structural element based on a manufacturing error or the like, the flow rate regulation and/or the temperature regulation can be achieved in a desired manner.

The first aspect of the present invention is a faucet valve apparatus including: a cylinder body having a hollow cylindrical shape; a cold water inlet hole, a hot water inlet hole and a mixed water outlet hole, each of which is formed in a circumferential wall of the cylinder body; a housing body containing the cylinder body in an axially movable and rotatable manner; a cold water supply channel, a hot water supply channel and a mixed water outlet channel, each of which is communicated with an inside space of the housing body; a first operation part provided on a one side in an axial direction of the cylinder body in a rotationally operable manner; a second operation part provided on the other side in the axial direction of the cylinder body in a rotationally operable manner; and a shaft body extending through the cylinder body in an axial direction thereof and connected to or integrated with the cylinder body; wherein both ends of the shaft body are located in a region which is not communicated with the inside space of the housing body and exposed to atmosphere; the cylinder body and the shaft body are affected by a rotational operation of the first operation part in such a manner that a rotational position of the cylinder body and the shaft body is changed, and the cylinder body and the shaft body are affected by a rotational operation of the second operation part in such a manner that an axial position of the cylinder body and the shaft body is changed; and a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation.

According to the faucet valve apparatus of the third aspect, depending on the axial position and the rotational position of the common cylinder body, both a temperature regulation and a flow rate regulation can be achieved. This makes it possible to design a compact faucet valve apparatus. In addition, there is no obstacle in electrification of the first operation part and in electrification of the second operation part. That is to say, the faucet valve apparatus of the third aspect is suitable for achieving electrification of both a temperature regulation and a flow rate regulation.

In addition, the faucet valve apparatus of the third aspect includes the shaft body extending through the cylinder body in the axial direction thereof and connected to or integrated with the cylinder body. According to this feature, a control for changing the position of the cylinder body can be achieved by a relatively simple structure which controls the position of the shaft body, In addition, in the faucet valve apparatus of the third aspect, both the ends of the shaft body are located in the region which is not communicated with the inside space of the housing body and are exposed to the atmosphere. According to this feature, an influence which a water pressure in the inside space of the housing body has on the shaft body is remarkably inhibited. Thus, a torque (force) required to cause the shaft body to rotate or move in the axial direction thereof can be made smaller. This is very convenient for achieving the electrification. For example, the region in which both the ends of the shaft body are located is shielded by a sealing member in such a manner that the region is not communicated with inside space of the housing body.

In addition, it is preferable that both the ends of the shaft body are maintained to be exposed to the atmosphere even when the axial position of the shaft body is changed by a rotational operation of the second operation part. According to this feature, even when the axial position of the shaft body is changed by the rotational operation of the second operation part, the state can be maintained in which the influence that the water pressure in the inside space of the housing body has on the shaft body is remarkably inhibited. Thus, a torque (force) required to cause the shaft body to rotate or move in the axial direction thereof may be maintained to be smaller. This is more convenient for achieving the electrification.

In addition, it is preferable that the housing body has a lid member on a one side in an axial direction thereof and another lid member on the other side in the axial direction in order to define the inside space thereof. According to this feature, by removing those lid members, it is easy to assemble and/or disassemble (for example, for a maintenance operation) structural elements in the housing body. In this case, it is further preferable that each of the lid members of the housing body is located inner than a corresponding end portion of the housing body in the axial direction thereof. According to this feature, it is possible to inhibit the length of the shaft body, which is convenient for making the faucet valve apparatus more compact.

In addition, it is preferable that the housing body and the cylinder body are in a direct contact with each other in order to provide a certain sealing performance. According to this feature, compared with a case wherein an elastic body such as a rubber packing is interposed between the housing body and the cylinder body, a great friction force is not generated, which can reduce a risk that an action (movement) of the cylinder body in the housing body is obstructed in an undesired manner.

In addition, it is preferable that the faucet valve apparatus of the third aspect further includes a regulation member capable of regulating a rotatable range of the second operation part in a desired manner. According to the above feature, a regulation of a movable range of the axial position of the shaft body and the cylinder body against the housing body can be achieved by a regulation of the rotatable range of the second operation part by the regulation member. Thus, even when there is variation between products of each structural element based on a manufacturing error or the like, the flow rate regulation and/or the temperature regulation can be achieved in a desired manner.

The fourth aspect of the present invention is a faucet valve apparatus including: a cylinder body having a hollow cylindrical shape; a cold water inlet hole, a hot water inlet hole and a mixed water outlet hole, each of which is formed in a circumferential wall of the cylinder body; a housing body containing the cylinder body in a rotatable manner; a cold water supply channel, a hot water supply channel and a mixed water outlet channel, each of which is communicated with an inside space of the housing body; an operation part provided on a one side in an axial direction of the cylinder body in a rotationally operable manner; and a shaft body extending through the cylinder body in an axial direction thereof and connected to or integrated with the cylinder body; wherein both ends of the shaft body are located in a region which is not communicated with the inside space of the housing body and exposed to atmosphere; the cylinder body and the shaft body are affected by a rotational operation of the operation part in such a manner that a rotational position of the cylinder body and the shaft body is changed; and a communication amount between the cold water supply channel and the cold water inlet hole, a communication amount between the hot water supply channel and the hot water inlet hole and/or a communication amount between the mixed water outlet hole and the mixed water outlet channel is changed depending on the rotational position of the cylinder body in order to achieve a temperature regulation.

According to the faucet valve apparatus of the fourth aspect, depending on the rotational position of the cylinder body, a temperature regulation can be achieved. This makes it possible to design a compact faucet valve apparatus.

In addition, according to the faucet valve apparatus of the fourth aspect, there is no obstacle in electrification of the operation part. That is to say, the faucet valve apparatus of the fourth aspect is suitable for achieving electrification of a temperature regulation.

In addition, the faucet valve apparatus of the fourth aspect includes the shaft body extending through the cylinder body in the axial direction thereof and connected to or integrated with the cylinder body. According to this feature, a control for changing the position of the cylinder body can be achieved by a relatively simple structure which controls the position of the shaft body, In addition, in the faucet valve apparatus of the fourth aspect, both the ends of the shaft body are located in the region which is not communicated with the inside space of the housing body and are exposed to the atmosphere.

According to the above feature, an influence which a water pressure in the inside space of the housing body has on the shaft body is remarkably inhibited. Thus, a torque (force) required to cause the shaft body to rotate can be made smaller. This is very convenient for achieving the electrification. For example, the region in which both the ends of the shaft body are located is shielded by a sealing member in such a manner that the region is not communicated with inside space of the housing body.

In addition, it is preferable that the faucet valve apparatus of the fourth aspect further includes a connection member connected to or integrated with one end portion of the shaft body and fixed to the operation part with respect to a rotational direction thereof, wherein the connection member is arranged in such a manner that the connection member is movable against the operation part with respect to an axial direction thereof. According to this feature, a rotational operation of the operation part can be surely transferred as a rotating force for the shaft body, while a force affected to the shaft body in the axial direction thereof does not obstruct an operation of the operation part.

In addition, it is preferable that the faucet valve apparatus of the fourth aspect further includes a holding member configured to limit an axial movement of the other end of the shaft body but not to limit a rotational movement of the other end of the shaft body. According to such a holding member, while the axial movement of the other end of the shaft body is limited, it is inhibited to obstruct the rotational movement of the shaft body and thus the rotational operation of the operation part.

In addition, it is preferable that the housing body has a lid member on a one side in an axial direction thereof and another lid member on the other side in the axial direction in order to define the inside space thereof. According to this feature, by removing those lid members, it is easy to assemble and/or disassemble (for example, for a maintenance operation) structural elements in the housing body. In this case, it is further preferable that each of the lid members of the housing body is located inner than a corresponding end portion of the housing body in the axial direction thereof. According to this feature, it is possible to inhibit the length of the shaft body, which is convenient for making the faucet valve apparatus more compact.

Advantageous Effects of Invention

According to the first aspect of the present invention, depending on the axial position and the rotational position of the common cylinder body, both a temperature regulation and a flow rate regulation can be achieved. This makes it possible to design a compact faucet valve apparatus. In addition, there is no obstacle in electrification of the first operation part and in electrification of the second operation part. That is to say, the faucet valve apparatus of the first aspect is suitable for achieving electrification of both a temperature regulation and a flow rate regulation.

According to the second aspect of the present invention, depending on the axial position and the rotational position of the common cylinder body, both a temperature regulation and a flow rate regulation can be achieved. This makes it possible to design a compact faucet valve apparatus. In addition, there is no obstacle in electrification of the first operation part and in electrification of the second operation part. That is to say, the faucet valve apparatus of the second aspect is suitable for achieving electrification of both a temperature regulation and a flow rate regulation.

According to the third aspect of the present invention, depending on the axial position and the rotational position of the common cylinder body, both a temperature regulation and a flow rate regulation can be achieved. This makes it possible to design a compact faucet valve apparatus. In addition, there is no obstacle in electrification of the first operation part and in electrification of the second operation part. That is to say, the faucet valve apparatus of the third aspect is suitable for achieving electrification of both a temperature regulation and a flow rate regulation.

According to the fourth aspect of the present invention, depending on the rotational position of the cylinder body, a temperature regulation can be achieved. This makes it possible to design a compact faucet valve apparatus. In addition, according to the fourth aspect of the present invention, there is no obstacle in electrification of the operation part. That is to say, the faucet valve apparatus of the fourth aspect is suitable for achieving electrification of a temperature regulation. Furthermore, according to the fourth aspect of the present invention, both the ends of the shaft body are located in the region which is not communicated with the inside space of the housing body and are exposed to the atmosphere, so that an influence which a water pressure in the inside space of the housing body has on the shaft body is remarkably inhibited. Therefore, a torque (force) required to cause the shaft body to rotate can be made smaller. This is very convenient for achieving the electrification.

BRIEF DESCRIPTION OF THE DRAWINGS

FIG. 10A is a schematic explanatory view showing a case in which the temperature regulation is achieved depending on the rotational position of the cylinder body and the flow rate regulation is achieved depending on the axial position of the cylinder body;

FIG. 11A is a schematic explanatory view showing a case in which the temperature regulation is achieved depending on the axial position of the cylinder body and the flow rate regulation is achieved depending on the rotational position of the cylinder body;

DETAILED DESCRIPTION OF THE PREFERRED EMBODIMENT

With reference to the attached drawings, we explain a faucet valve apparatus according to a first embodiment of the present invention. The faucet valve apparatus 100 of the first embodiment is a faucet valve apparatus which is suitable for achieving electrification of both a temperature regulation and a flow rate regulation.

Figure 1:
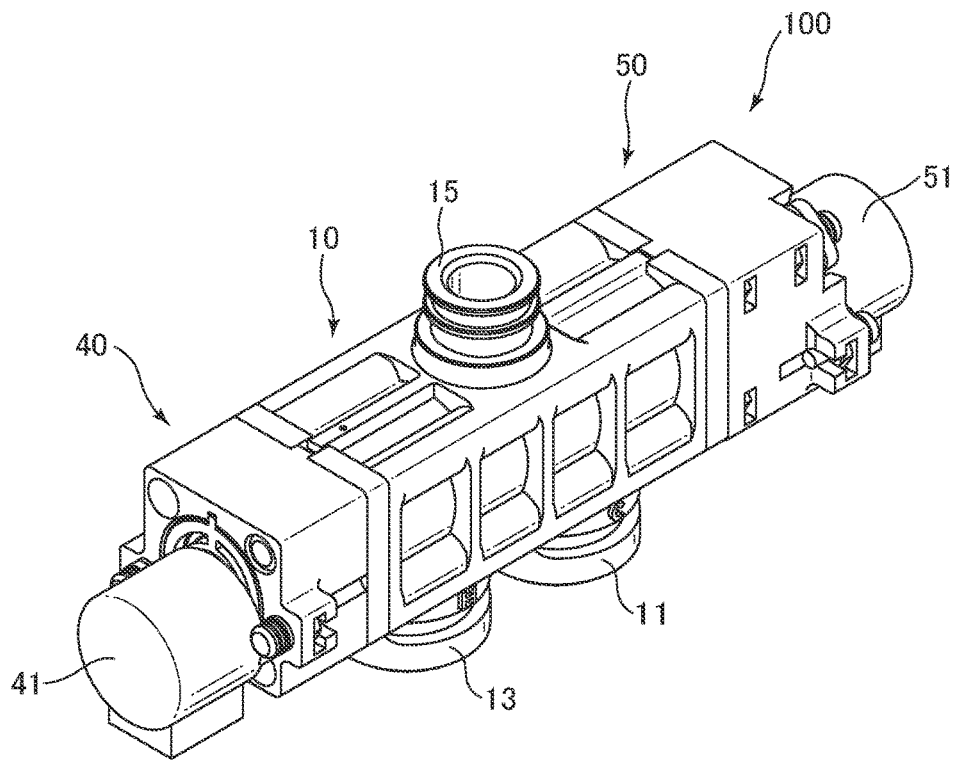
FIG. 1 is a schematic perspective view showing a faucet valve apparatus according to a first embodiment of the present invention.
Figure 2:
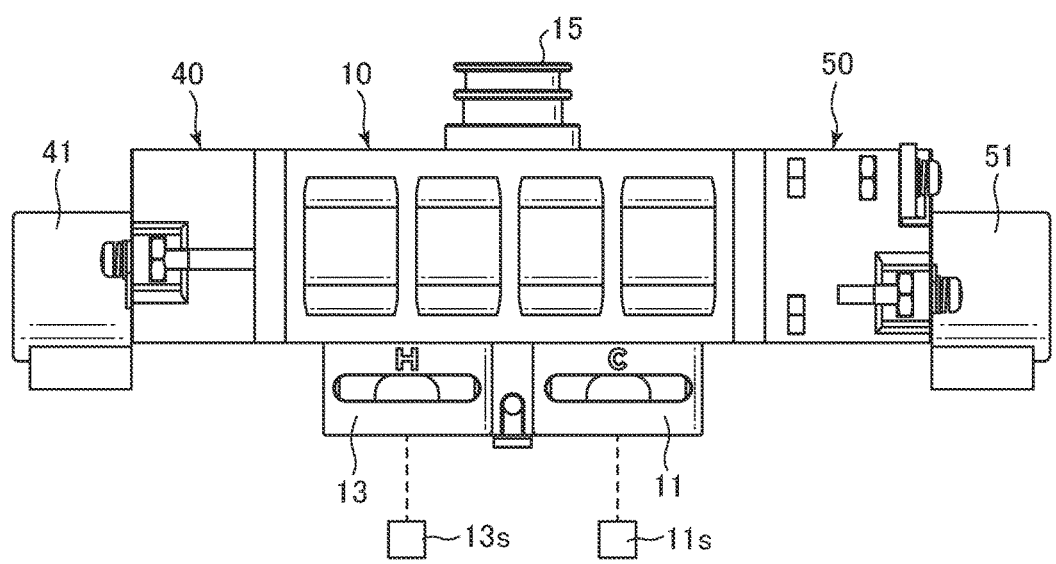
FIG. 2 is a schematic front view showing the faucet valve apparatus according to the first embodiment of the present invention.
Figure 3:
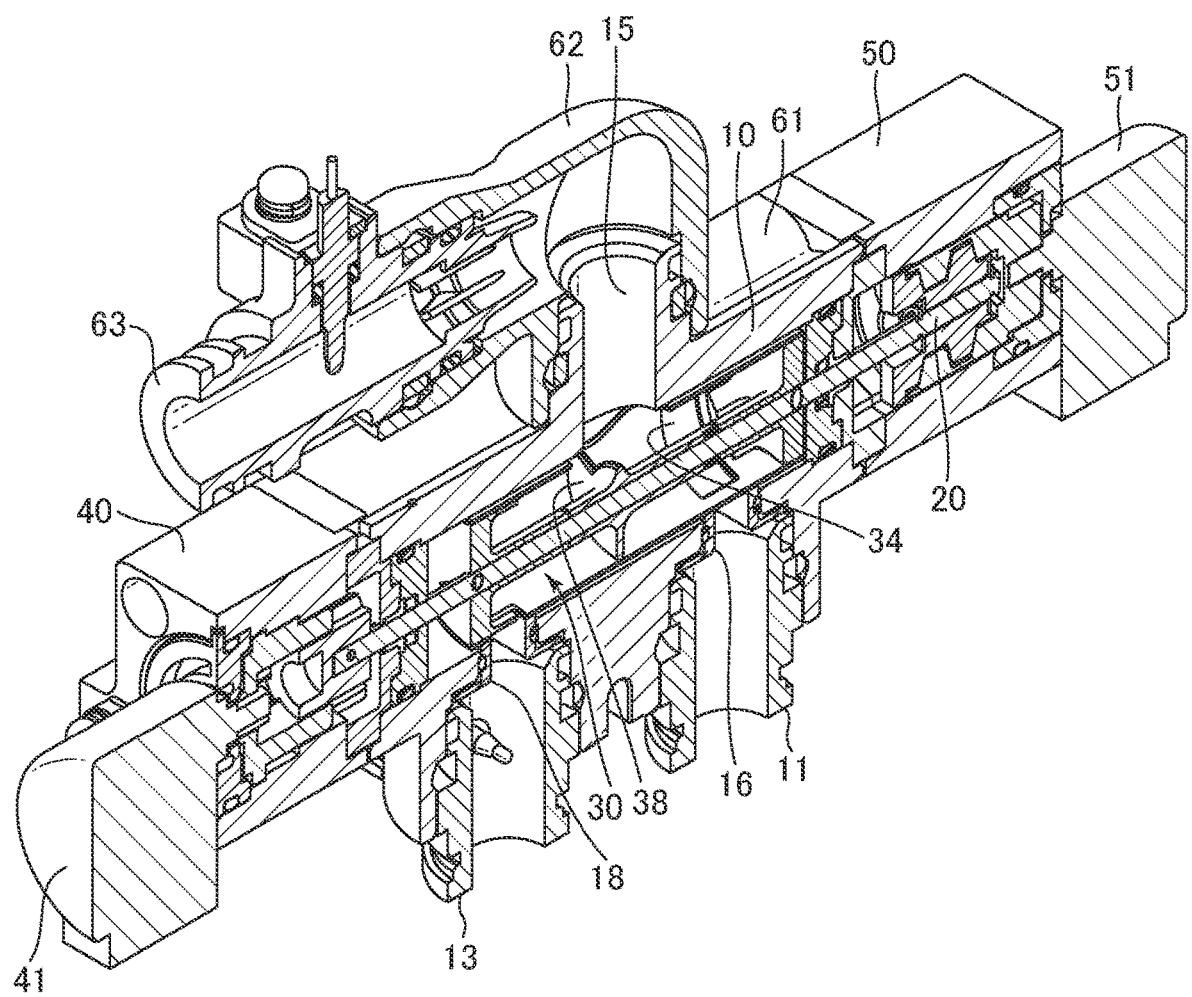
FIG. 3 is a schematic longitudinal sectional perspective view showing the faucet valve apparatus according to the first embodiment of the present invention.
Figure 4:
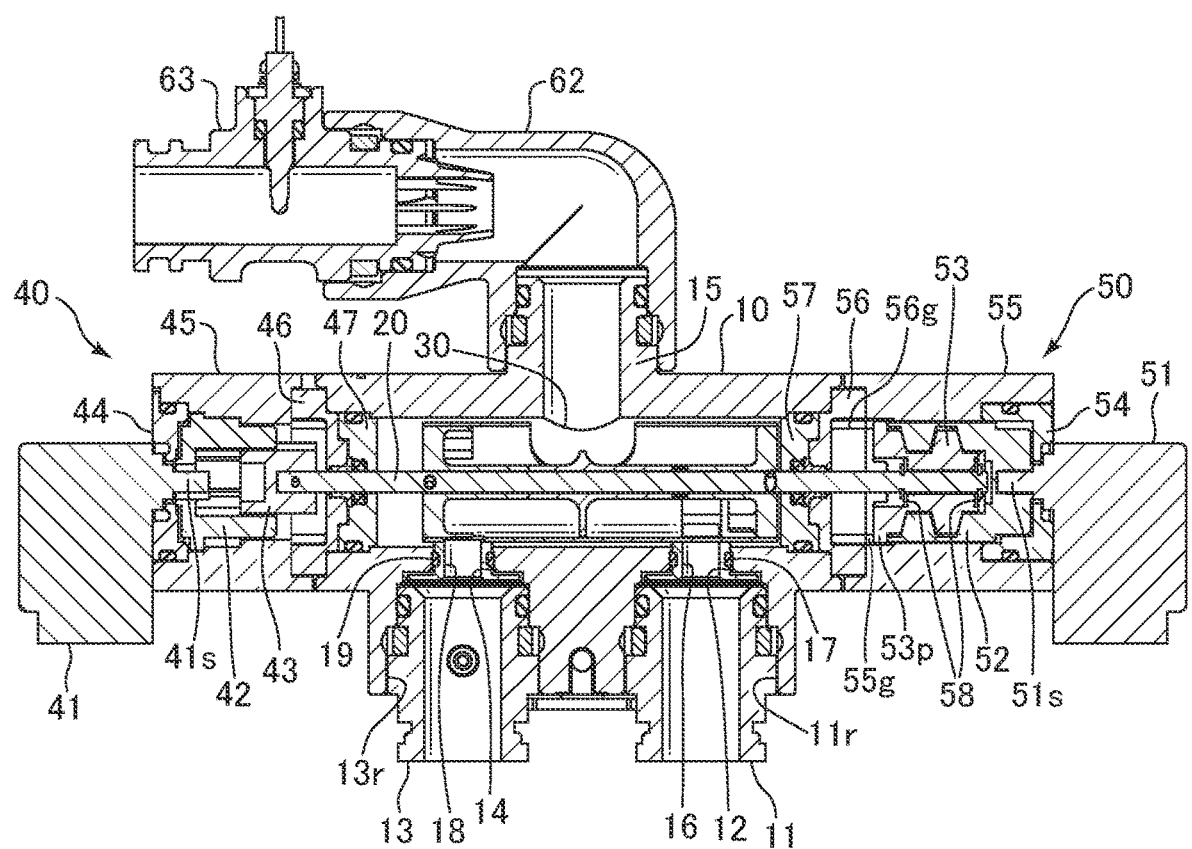
FIG. 4 is a schematic longitudinal sectional view showing the faucet valve apparatus according to the first embodiment of the present invention.
Figure 5:
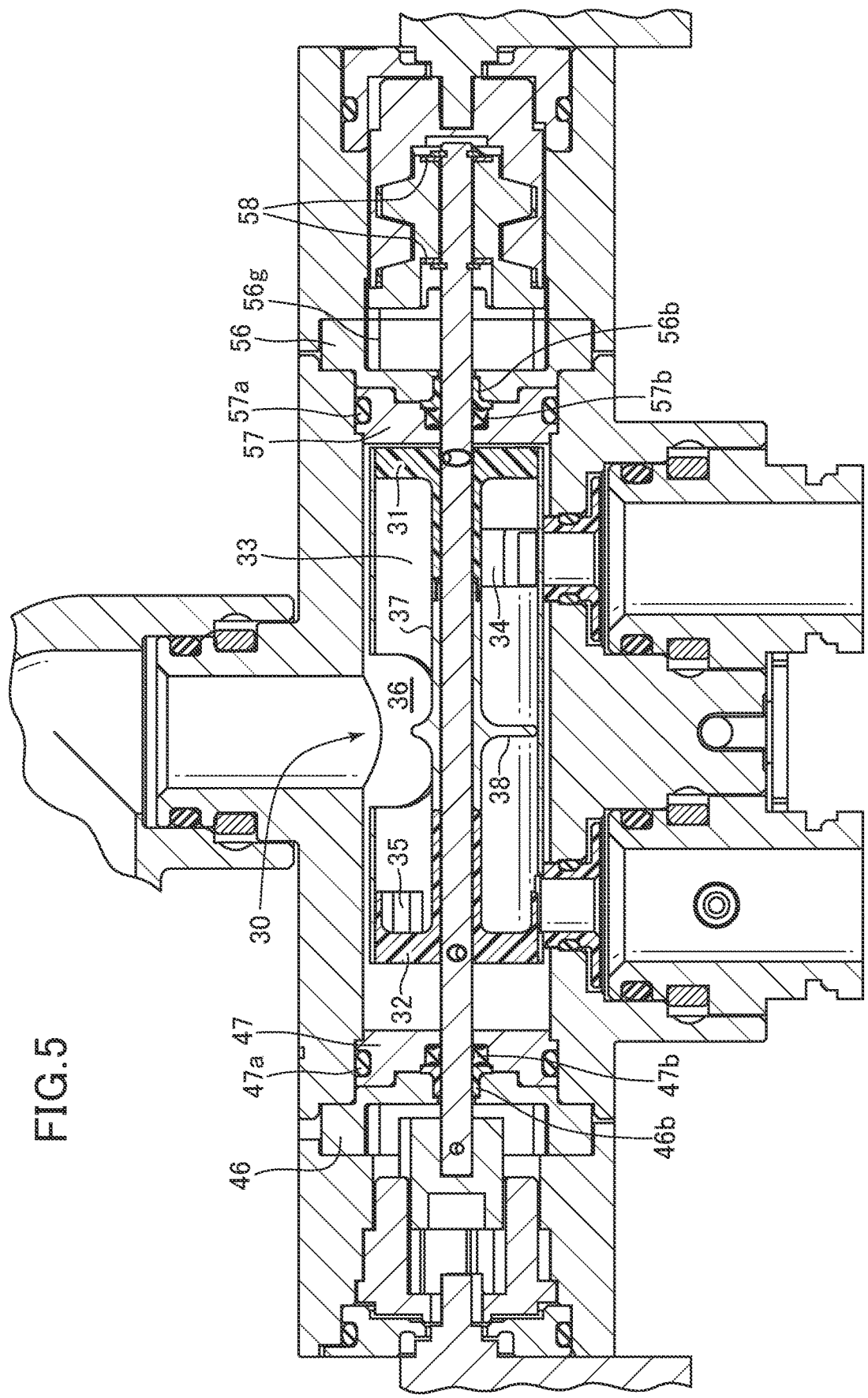
FIG. 5 is an enlarged view of the cylinder body shown in FIG. 4.
Figure 6:
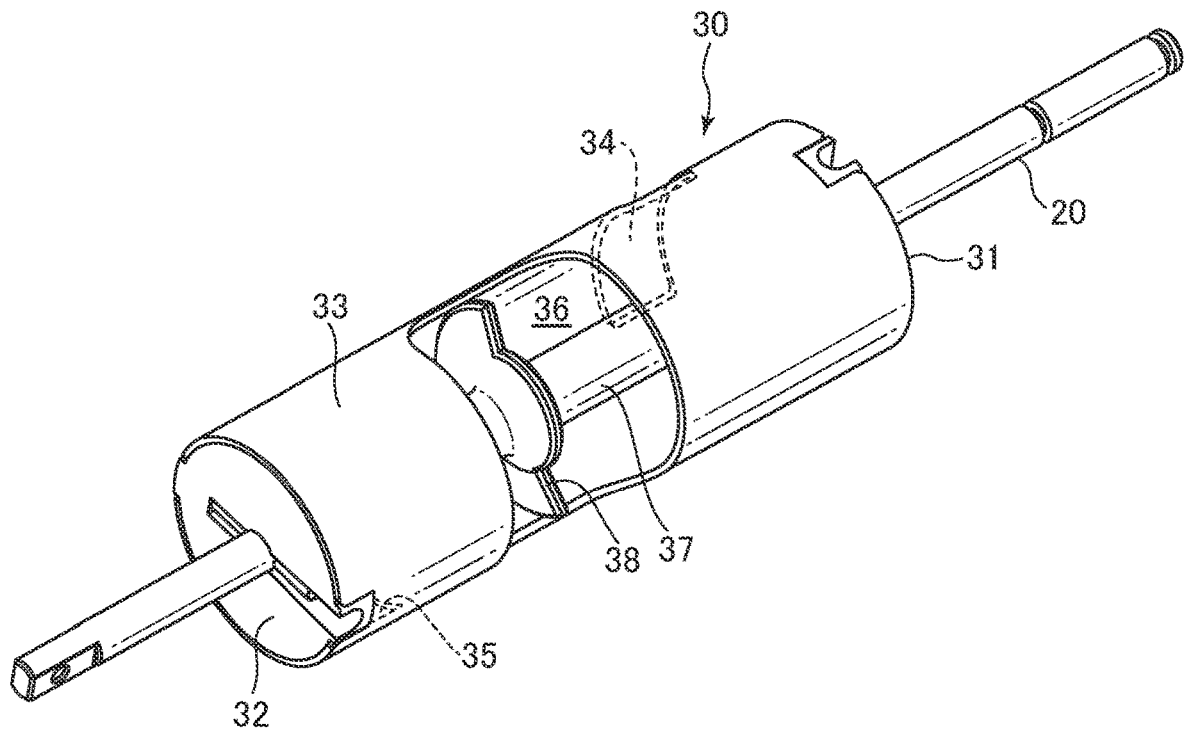
FIG. 6 is a schematic perspective view showing the cylinder body and the shaft body, separated from the other structure, according to the first embodiment of the present invention.

FIG. 1 is a schematic perspective view showing the faucet valve apparatus 100 according to the first embodiment of the present invention. FIG. 2 is a schematic front view showing the faucet valve apparatus 100 according to the first embodiment. FIG. 3 is a schematic longitudinal sectional perspective view showing the faucet valve apparatus 100 according to the first embodiment. FIG. 4 is a schematic longitudinal sectional view showing the faucet valve apparatus 100 according to the first embodiment. FIG. 5 is an enlarged view of a cylinder body 30 shown in FIG. 4. FIG. 6 is a schematic perspective view showing the cylinder body 30 and a shaft body 20, separated from the other structure, according to the first embodiment.

As shown in FIGS. 1 to 6, the faucet valve apparatus 100 according to the first embodiment includes: a cylinder body 30 having a hollow cylindrical shape; and a housing body 10 containing the cylinder body 30 in an axially movable and rotatable manner.

For example, the cylinder body 30 has an outer diameter of 15 mm, a thickness of 0.5 mm and an axial length of 50 mm, and is made of stainless steel. Alternatively, the cylinder body 30 may be made of a resin material. In the latter case, it is preferable that a thickness of the cylinder body 30 is greater than in the former case.

In particular, with reference to FIG. 5, a right end wall 31 made of a resin is fitted in a right end of the cylinder body 30, and a left end wall 32 made of a resin is fitted in a left end of the cylinder body 30.

A cold water inlet hole 34, which has a substantially rectangular shape, is formed in a right side region of a circumferential wall 33 of the cylinder body 30. For example, the cold water inlet hole 34 is provided between 0° (which is used as a criterion for angular positions in the hereinafter explanation) and 90° with respect to a circumferential angle (as measured around an axis of the cylinder body 30). The cold water inlet hole 34 is located at an axial region a certain distance away from the right end of the cylinder body 30.

A hot water inlet hole 35, which has a substantially rectangular shape, is formed in a left side region of the circumferential wall 33 of the cylinder body 30. For example, the hot water inlet hole 35 is provided between 90° and 180° with respect to the circumferential angle (as measured around the axis of the cylinder body 30), That is to say, the hot water inlet hole 35 is provided at an angular region different from that of the cold water inlet hole 34. The hot water inlet hole 35 is located at an axial region a certain distance away from the left end of the cylinder body 30.

A mixed water outlet hole 36 is formed in a substantially middle region of the circumferential wall 33 of the cylinder body 30 in an axial direction thereof.

In addition, the cylinder body 30 of the present embodiment has a center pipe 37, which extends from the right end wall 31 to the left end wall 32. A partition wall 38 extends radially outwardly from the center pipe 37 at an axial position corresponding to the mixed water outlet hole 36 of the cylinder body 30 (see FIG. 6).

A shaft body 20 is inserted through the center pipe 37, and fixed to both the right end wall 31 and the left end wall 32. Thereby, the shaft body 20 and the cylinder body 30 are configured to be rotatable and movable in an axial direction thereof in an integral manner. For example, the shaft body 20 is Φ3, and is made of stainless steel. For example, an inside space of the housing body 10 containing the cylinder body 30 is a cylindrical space, and there is a gap space between the housing body 10 and the circumferential wall 33 of the cylinder body 30. The hosing body 10 is also made of stainless steel. On the other hand, an outer appearance of the housing body 10 is substantially quadrangular, and is made of (coated with) a PPS (polyphenylene sulfide) resin.

In particular, with reference to FIGS. 4 and 5, a left end of the inside space of the housing body 10 is defined by a left side lid member 47. The left side lid member 47 is a generally disc-shaped member, and is fitted onto an inside stepped surface of the housing body 10 via an O-ring 47a. In addition, the left side lid member 47 is provided with a through hole at a center thereof, through which the shaft body 20 is inserted. The through hole is sealed by an X-ring 47b while permitting the shaft body 20 to rotate and move in the axial direction thereof.

Similarly, a right end of the inside space of the housing body 10 is defined by a right side lid member 57. The right side lid member 57 is a generally disc-shaped member, and is fitted onto another inside stepped surface of the housing body 10 via another O-ring 57a. In addition, the right side lid member 57 is provided with a through hole at a center thereof, through which the shaft body 20 is inserted. The through hole is sealed by another X-ring 57b while permitting the shaft body 20 to rotate and move in the axial direction thereof.

In addition, in the housing body 10, there are provided a cold water supply channel, a hot water supply channel and a mixed water outlet channel, each of which is communicated with the inside space of the housing body 10. Specifically, the mixed water outlet channel is provided by a mixed water outlet port 15 which is integral with the housing body 10. The mixed water outlet port 15 is opened upward from the housing body 10, and is connected to a mixed water supply pipe 63 via an elbow-shaped connecting pipe 62.

In addition, the mixed water outlet port 15 is provided in such a size and position that the whole mixed water outlet hole 36 of the cylinder body 30 can be communicated with the mixed water outlet port 15 no matter which position and posture the cylinder body 30 is in within a movable range thereof.

On the other hand, the cold water supply channel of the present embodiment is provided by: a cold water supply pipe 11 which is removable from the housing body 10; and a cold water communication hole 12 which communicates an inside space of the cold water supply pipe 11 with the inside space of the housing body 10. The cold water supply pipe 11 is fitted in a connection port 11r provided in a lower surface of the housing body 10, via an O-ring. The cold water communication hole 12 has a circular cross-section shape on the side of the cold water supply pipe 11 and a rectangular cross-section shape on the side of the inside space of the housing body 10, the rectangular cross-section shape fitting within the circular cross-section shape.

Similarly, the hot water supply channel of the present embodiment is provided by: a hot water supply pipe 13 which is removable from the housing body 10; and a hot water communication hole 14 which communicates an inside space of the hot water supply pipe 13 with the inside space of the housing body 10. Similarly to the cold water supply pipe 11 the hot water supply pipe 13 is fitted in another connection port 13r provided in the lower surface of the housing body 10, via an O-ring. Similarly to the cold water communication hole 12, the hot water communication hole 14 has a circular cross-section shape on the side of the hot water supply pipe 13 and a rectangular cross-section shape on the side of the inside space of the housing body 10, the rectangular cross-section shape fitting within the circular cross-section shape.

A lower side (an example of a one side) of a cold-water assist pipe member 16 is contained in the cold water communication hole 12. The cold-water assist pipe member 16 is slidable upward and downward in the cold water communication hole 12 depending on a water pressure difference between the lower side and an upper side (an example of the other side) thereof. Specifically, a rubber packing 17 (a sealing member for cold water) is interposed between the cold water communication hole 12 and the cold-water assist pipe member 16, and the rubber packing 17 holds the cold-water assist pipe member 16 with respect to the cold water communication hole 12 in such a manner that the cold-water assist pipe member 16 is slidable upward and downward with respect to the cold water communication hole 12. When the cold-water assist pipe member 16 is slid upward, the upper side (an example of the other side) of the cold-water assist pipe member 16 can be brought into contact with the circumferential wall 33 of the cylinder body 30 and cab be communicated with the cold water inlet hole 34.

Figure 7:
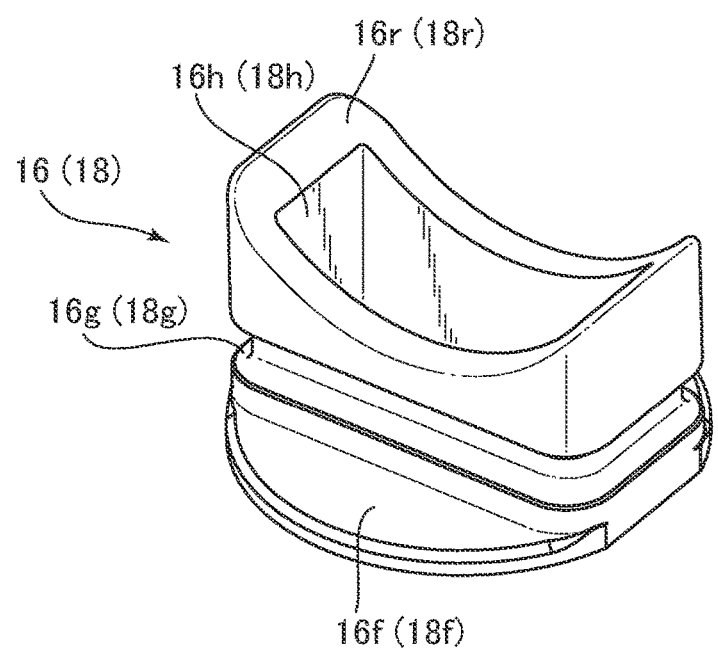
FIG. 7 is a schematic perspective view showing the cold-water assist pipe member according to the first embodiment of the present invention (the hot-water assist pipe member is similar)

FIG. 7 is a schematic perspective view showing the cold-water assist pipe member 16 of the present embodiment. As shown in FIG. 7, the cold-water assist pipe member 16 of the present embodiment has a flange part 16f as a movement regulating part, which regulates a movable (slidable) stroke of the cold-water assist pipe member 16 with respect to the inside wall of the cold water communication hole 12. The flange part 16f is contained in the region having the circular cross-section shape of the cold water communication hole 12 on the side of the cold water supply pipe 11. On the other hand, the flange part 16f has such a size that the flange part 16f cannot enter the region having the rectangular cross-section shape of the cold water communication hole 12. Thereby, when the flange part 16f is brought into abutment with the latter region, the movable (slidable) stroke of the cold-water assist pipe member 16 is regulated. In the present embodiment, the movable (slidable) stroke of the cold-water assist pipe member 16 is 1 mm. In addition, the cold-water assist pipe member 16 has a groove part 16g, on which the rubber packing 17 is fitted.

As shown in FIG. 7, at the time of shipment (prior to use), an upper surface 16r of the cold-water assist pipe member 16 is a part of a cylindrical surface having a curvature radius of 10 mm (which preferable range is between 5 mm and 15 mm). That is to say, the curvature radius is slightly greater than a curvature radius of the circumferential wall 33 of the cylinder body 30 (7.5 mm). Thereby, it can be avoided that only both ends of the upper surface 16r of the cold-water assist pipe member 16 in an arc direction thereof are brought into contact with the cylinder body 30 (which might be caused when the magnitude relationship between the above two curvature radiuses is opposite). That is to say, a situation is ensured in which a middle portion of the upper surface 16r of the cold-water assist pipe member 16 in the arc direction thereof is brought into contact with the cylinder body 30. Thereby, a more closely contact between the upper surface 16r of the cold-water assist pipe member 16 and the cylinder body 30 can be achieved.

Hardness of (at least the upper surface of) the cold-water assist pipe member 16 is smaller than that of the circumferential wall 33 of the cylinder body 30. Thus, it can be inhibited that the circumferential wall 33 of the cylinder body 30 is worn down in an undesired manner. On the other hand, it can be expected that the upper surface 16r of the cold-water assist pipe member 16 is worn down so as to align with (follow) the circumferential wall 33 of the cylinder body 30. This is preferable for the closely contact between the upper surface 16r of the cold-water assist pipe member 16 and the cylinder body 30. Herein, since the movable stroke of the cold-water assist pipe member 16 is regulated by the flange part 16f as a movement regulating part, it can be inhibited that the upper surface 16r of the cold-water assist pipe member 16 is worn down more than necessary.

The degree of hardness is judged by "Vickers hardness", which is obtained by a test defined in ISO 6507 (JIS Z 2244). The cold-water assist pipe member 16 of the present embodiment is made of a polyacetal resin, whose hardness is remarkably smaller than that of the circumferential wall 33 of the cylinder body 30 made of stainless steel.

Figure 9:
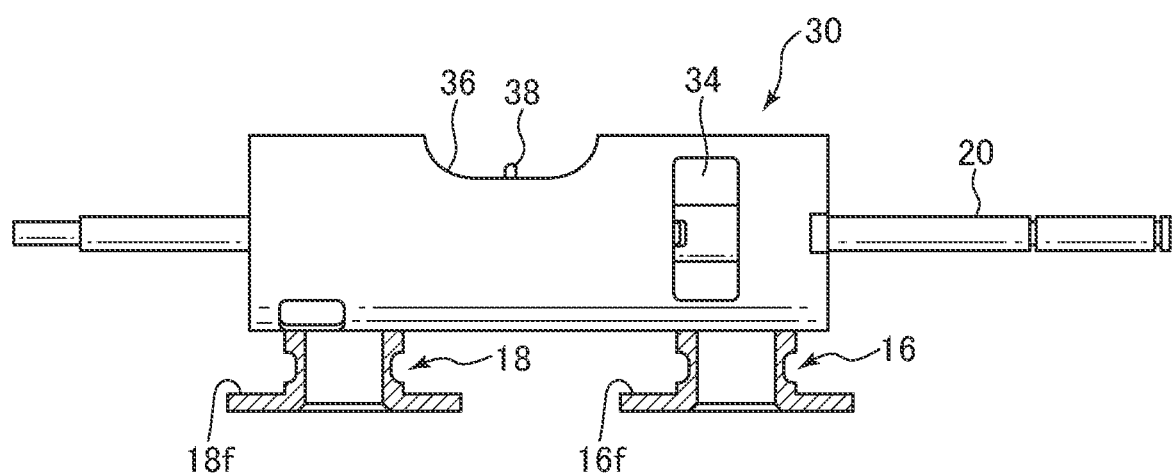
FIG. 9 is a schematic view showing a state in which the cold-water assist pipe member and the hot-water assist pipe member are in contact with the cylinder body according to the first embodiment of the present invention.

A pipe hole 16h of the cold-water assist pipe member 16 is provided in such a size and position (with respect to the axial direction of the housing body 10) that the whole cold water inlet hole 34 of the cylinder body 30 can be communicated with the pipe hole 16h in a situation in which a communication amount between the cold-water assist pipe member 16 and the cold water inlet hole 34 is controlled to be maximal (see FIGS. 9 and 10).

Similarly, a lower side (an example of a one side) of a hot-water assist pipe member 18 is contained in the hot water communication hole 14. The hot-water assist pipe member 18 is slidable upward and downward in the hot water communication hole 14 depending on a water pressure difference between the lower side and an upper side (an example of the other side) thereof. Specifically, a rubber packing 19 (a sealing member for hot water) is interposed between the hot water communication hole 14 and the hot-water assist pipe member 18, and the rubber packing 19 holds the hot-water assist pipe member 18 with respect to the hot water communication hole 14 in such a manner that the hot-water assist pipe member 18 is slidable upward and downward with respect to the hot water communication hole 14. When the hot-water assist pipe member 18 is slid upward, the upper side (an example of the other side) of the hot-water assist pipe member 18 can be brought into contact with the circumferential wall 33 of the cylinder body 30 and cab be communicated with the hot water inlet hole 35.

FIG. 7 is also a schematic perspective view showing the hot-water assist pipe member 18 of the present embodiment. As shown in FIG. 7, the hot-water assist pipe member 18 of the present embodiment also has a flange part 18f as a movement regulating part, which regulates a movable (slidable) stroke of the hot-water assist pipe member 18 with respect to the inside wall of the hot water communication hole 14. The flange part 18f is contained in the region having the circular cross-section shape of the hot water communication hole 14 on the side of the hot water supply pipe 13. On the other hand, the flange part 18f has such a size that the flange part 18f cannot enter the region having the rectangular cross-section shape of the hot water communication hole 14. Thereby, when the flange part 18f is brought into abutment with the latter region, the movable (slidable) stroke of the hot-water assist pipe member 18 is regulated. In the present embodiment, the movable (slidable) stroke of the hot-water assist pipe member 18 is 5 mm. In addition, the hot-water assist pipe member 18 has a groove part 18g, on which the rubber packing 19 is fitted.

As shown in FIG. 7, at the time of shipment (prior to use), an upper surface 18r of the hot-water assist pipe member 18 is also a part of a cylindrical surface having a curvature radius of 10 mm (which preferable range is between 5 mm and 15 mm). That is to say, the curvature radius is slightly greater than a curvature radius of the circumferential wall 33 of the cylinder body 30 (7.5 mm). Thereby, it can be avoided that only both ends of the upper surface 18r of the hot-water assist pipe member 18 in an arc direction thereof are brought into contact with the cylinder body 30 (which might be caused when the magnitude relationship between the above two curvature radiuses is opposite). That is to say, a situation is ensured in which a middle portion of the upper surface 18r of the hot-water assist pipe member 18 in the arc direction thereof is brought into contact with the cylinder body 30. Thereby, a more closely contact between the upper surface 18r of the hot-water assist pipe member 18 and the cylinder body 30 can be achieved.

Hardness of (at least the upper surface of) the hot-water assist pipe member 18 is also smaller than that of the circumferential wall 33 of the cylinder body 30. Thus, it can be inhibited that the circumferential wall 33 of the cylinder body 30 is worn down in an undesired manner. On the other hand, it can be expected that the upper surface 18r of the hot-water assist pipe member 18 is worn down so as to align with (follow) the circumferential wall 33 of the cylinder body 30. This is preferable for the closely contact between the upper surface 18r of the hot-water assist pipe member 18 and the cylinder body 30. Herein, since the movable stroke of the hot-water assist pipe member 18 is regulated by the flange part 18f as a movement regulating part, it can be inhibited that the upper surface 18r of the hot-water assist pipe member 18 is worn down more than necessary.

The hot-water assist pipe member 18 of the present embodiment is also made of a polyacetal resin, whose hardness is remarkably smaller than that of the circumferential wall 33 of the cylinder body 30 made of stainless steel.

A pipe hole 18h of the hot-water assist pipe member 18 is provided in such a size and position (with respect to the axial direction of the housing body 10) that the whole hot water inlet hole 35 of the cylinder body 30 can be communicated with the pipe hole 18h in a situation in which a communication amount between the hot-water assist pipe member 18 and the hot water inlet hole 35 is controlled to be maximal (see FIGS. 9 and 10).

As shown in FIGS. 1 to 4, a first operation mechanism 40 is provided on a left side (on a one side in an axial direction) of the cylinder body 30. The first operation mechanism 40 has a first operation part 41 which is provided in a rotationally operable manner. In the present embodiment, the first operation part 41 is a stepping motor configured to receive a control command from a control main unit (not shown) and to be driven to rotate by the control command.

In the present embodiment, the shaft body 20 and the cylinder body 30 are affected by a rotational operation of the first operation part 41 in such a manner that a rotational position of the shaft body 20 and the cylinder body 30 is changed while an axial position of the shaft body 20 and the cylinder body 30 is not changed, Specifically, in particular as shown in FIG. 4, a rotation shaft (output shaft) 41s of the first operation part 41 is fixed to a bottom part of a rotation cylinder 42 with respect to both an axial direction thereof and a rotation direction thereof. The rotation cylinder 42 is arranged such that the bottom part thereof is positioned on the left side. The rotation cylinder 42 is held in a housing cylinder 45 in a rotatable manner around an axis thereof.

The housing cylinder 45 holds a main part (a portion in a vicinity of the rotation shaft 41s) of the first operation part 41 via a holding ring 44 on the left side thereof. In addition, the housing cylinder 45 is connected (fitted) to a left end part of the housing body 10 and the left side lid member 47 via a connection ring 46 on the right side thereof. The connection ring 46 is provided with a slide bearing (bush) 46b made of a resin at a center thereof, through which the shaft body 20 is inserted (see FIG. 5).

The rotation cylinder 42 is opened on the right side (opposite to the bottom part). A slider cylinder 43 is fitted in the rotation cylinder 42 in a slidable manner in an axial direction thereof. The rotation cylinder 42 and the slider cylinder 43 are fixed to each other with respect to a rotation direction thereof. For example, the slider cylinder 43 has four convex parts which protrude in a cross shape in an axial cross section thereof, and the rotation cylinder 42 has four concave parts which contain the four convex parts in a slidable manner in an axial direction thereof. That is to say, each of the four convex parts is contained in a corresponding one of the four convex parts. When the rotation cylinder 42 is rotated, the slider cylinder 43 is also rotated. When the slider cylinder 43 is rotated, the shaft body 20 and the cylinder body 30 are also rotated. On the other hand, the slider cylinder 43 is contained in the rotation cylinder 42 without being fixed to the rotation cylinder 42 with respect to the axial direction thereof. Thereby, even when the shaft body 20 is moved in the axial direction thereof, it is inhibited that the rotation cylinder 42 is moved in the axial direction thereof, or an axial moving force is not applied to the rotation cylinder 42 and thus the rotation cylinder 42 maintains an idling state of the movement in the axial direction thereof. (Thereby, even when an operating force of a second operation part 51, which will be described below, is relatively smaller, the shaft body 20 and the cylinder body 30 are sufficiently movable in the axial direction thereof.)

The slider cylinder 43 is fixed to a left end portion of the shaft body 20. Thereby, the slider cylinder 43 serves as a first connection member, that is to say, the slider cylinder 43 is fixed to the rotation shaft 41s of the first operation part 41 with respect to the rotational direction thereof, while the slider cylinder 43 is installed in such a manner that the slider cylinder 43 is movable against the rotation shaft 41s of the first operation part 41 with respect to the axial direction thereof.

In the present embodiment, the first operation part 41 is configured to provide a rotational operation up to 90°+α. On the other hand, a second operation mechanism 50 is provided on a right side (on the other side in the axial direction) of the cylinder body 30. The second operation mechanism 50 has a second operation part 51 which is provided in a rotationally operable manner. In the present embodiment, the second operation part 51 is also a stepping motor configured to receive a control command from the control main unit (not shown) and to be driven to rotate by the control command.

In the present embodiment, the shaft body 20 and the cylinder body 30 are affected by a rotational operation of the second operation part 51 in such a manner that the axial position of the shaft body 20 and the cylinder body 30 is changed while the rotational position of the shaft body 20 and the cylinder body 30 is not changed. Specifically, in particular as shown in FIG. 4, a rotation shaft (output shaft) 51s of the second operation part 51 is fixed to a bottom part of a rotation cylinder 52 with respect to both an axial direction thereof and a rotation direction thereof. The rotation cylinder 52 is arranged such that the bottom part thereof is positioned on the right side. The rotation cylinder 52 is held in a housing cylinder 55 in a rotatable manner around an axis thereof.

The housing cylinder 55 holds a main part (a portion in a vicinity of the rotation shaft 51s) of the second operation part 51 via a holding ring 54 on the right side thereof. In addition, the housing cylinder 55 is connected (fitted) to a right end part of the housing body 10 and the right side lid member 57 via a connection ring 56 on the left side thereof. The connection ring 56 is also provided with a slide bearing (bush) 56b made of a resin at a center thereof, through which the shaft body 20 is inserted (see FIG. 5).

In the rotation cylinder 52, there is formed a space corresponding to a trapezoidal double-start internal thread having a pitch of 16, The rotation cylinder 52 is opened on the left side (opposite to the bottom part). An external thread body 53 corresponding to the trapezoidal double-start internal thread whose pitch is 16 is threadedly engaged in the space, A left end portion of the external thread body 53 is positioned more leftward than a left end of the rotation cylinder 52, and has a projection part 53p (for example, two projection parts at upper and lower portions) which projects into a groove (grooves 55g, 56g) provided in an inner circumferential surface of the housing cylinder 55 (and, in the present embodiment, provided in an inner circumferential surface of the connection ring 56). The projection part(s) 53p is (are) slidable in the groove (grooves 55g, 56g) in an axial direction thereof. Thereby, when the rotation shaft 51s of the second operation part 51 is rotated, the rotation cylinder 52 is also rotated, while the external thread body 53 is moved in an axial direction thereof by the threadedly engagement between the inside space of the rotation cylinder 52 and the external thread body 53 and by the engagement between the groove (grooves 55g, 56g) and the projection part(s) 53p.

The external thread body 53 holds a right end portion of the shaft body 20 via a pair of retaining rings 58. Thereby, the external thread body 53 and the shaft body 20 are fixed to each other with respect to an axial direction thereof, while being rotatable to each other, and thus when the external thread body 53 is moved in the axial direction, the shaft body 20 is also moved in the axial direction. That is to say, the shaft body 20 is contained in the rotation cylinder 52 in a rotatable manner to the external thread body 53. Thereby, when the shaft body 20 is rotated, it is inhibited that the external thread body 53 is rotated, or a rotating force is not applied to the external thread body 53 and thus the external thread body 53 maintains an idling state of the movement in the rotational direction thereof. (Thereby, even when an operating force of the first operation part 41 as described above is relatively smaller, the shaft body 20 and the cylinder body 30 are sufficiently rotatable.)

According to the above structure, the rotation cylinder 52 (the space therein corresponding to the trapezoidal double-start internal thread) serves as a direction conversion member, i.e., is configured to convert a rotational operating force of the second operation part 51 to an axial moving force, and the external thread body 53 and the retaining rings 58 serve as a second connection member, i.e., are configured to receive the axial moving force converted by the rotation cylinder 52.

In the present embodiment, the second operation part 51 is configured to provide a rotational operation up to about 150°, Thereby, the shaft cylinder 20 (and the cylinder body 30) has a movable stroke of about 6.0 mm in the axial direction thereof.

The faucet valve apparatus 100 of the present embodiment further includes a regulation member capable of regulating a rotatable range of the second operation part 51 in a desired manner. Specifically, as shown in FIGS. 8A to 8C, a projection region 54p provided on an inner circumferential surface of the holding ring 54 serves as a regulation member, i.e., is configured to block a part of a rotation trajectory of a stopper 52s provided on an outer circumferential surface of the rotation cylinder 52, in order to regulate a rotatable range of the rotation cylinder 52 (a rotatable range of the second operation part 51).

Figure 8A:
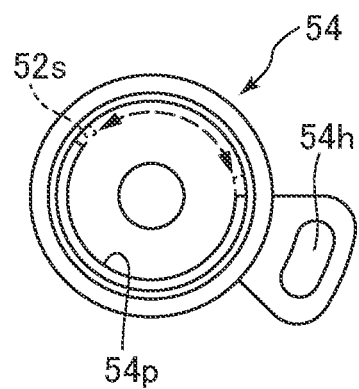
FIG. 8A is a side view showing the regulation member according to the first embodiment of the present invention, as seen from an inner side thereof.
Figure 8B:
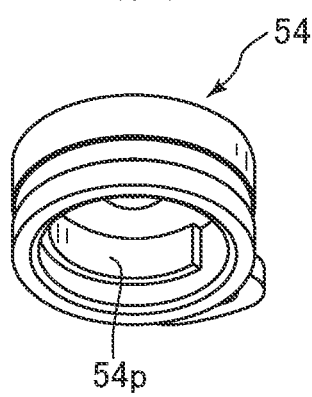
FIG. 8B is a perspective view showing the regulation member according to the first embodiment of the present invention, as seen from another inner side thereof.
Figure 8C:
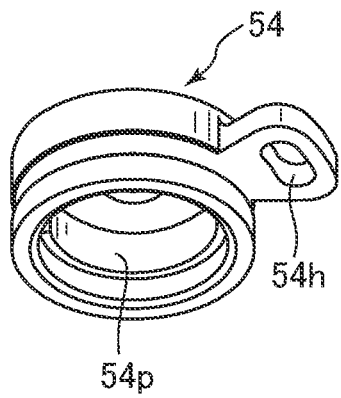
FIG. 8C is another perspective view showing the regulation member according to the first embodiment of the present invention, as seen from further another inner side thereof.

FIG. 8A is a side view showing the projection region 54p provided on the inner circumferential surface of the holding ring 54 as seen from an inner side thereof, and FIGS. 8B and 8C are perspective views showing the projection region 54p as seen from other inner sides thereof. As shown in FIGS. 8A to 8C, in the present embodiment, the projection region 54p extends over about 210°. Thus, the rotatable range of the rotation cylinder 52 (the rotatable range of the second operation part 51) is regulated to about 150°.

A fixing position of the holding ring 54 with respect to the housing cylinder 55 is manually adjustable by means of an elongated hole 54h. Thereby, the rotatable range of the rotation cylinder 52 (the rotatable range of the second operation part 51) can be adjusted in accordance with a desired movable range of the shaft cylinder 20 (and the cylinder body 30) in the axial direction thereof. That is to say, a regulation of a movable range of the axial position of the shaft body 20 and the cylinder body 30 with respect to the housing body 10 can be achieved by a regulation of the rotatable range of the second operation part 51 by an adjustment of the fixing position of the holding ring 54 (regulation member). Thus, even when there is variation between products of each structural element based on a manufacturing error or the like, a desired flow rate regulation and/or a desired temperature regulation can be achieved, which will be described below.

According to the above structure, both ends of the shaft body 20 in the present embodiment are located in a shielded region which is not communicated with the inside space of the housing body 10 and are exposed to an atmosphere (are not under a water pressure, but under the atmospheric pressure). Specifically, the left end of the shaft body 20 is shielded by the slide bearing (bush) 46b and the X-ring 47b in order not to be communicated with inside space of the housing body 10, and the right end of the shaft body 20 is shielded by the slide bearing (bush) 56b and the X-ring 57b in order not to be communicated with inside space of the housing body 10. According to this feature, an influence which a water pressure in the inside space of the housing body 10 has on the shaft body 20 is remarkably inhibited. Thus, a torque (force) required to cause the shaft body 20 (and the cylinder body 30) to rotate or move in the axial direction thereof may be made smaller. That is to say, a torque required for each of the first operation part 41 and the second operation part 51 may be made smaller. It is further preferable that the shielded (sealed) parts of the shaft body 20 has the same diameter.

In addition, both the ends of the shaft body 20 are maintained to be exposed to the atmosphere even when the axial position of the shaft body 20 is changed by a rotational operation of the second operation part 51. According to this feature, even when the axial position of the shaft body 20 is changed, the torque required for each of the first operation part 41 and the second operation part 51 may be made smaller.

In addition, the housing body 10 has the left side lid member 47 and the right side lid member 57 in order to define the inside space thereof. By removing these lid members 47, 57, it is easy to assemble and/or disassemble (for example, for a maintenance operation) the structural elements in the housing body 10.

Furthermore, in the present embodiment, each of the lid members 47, 57 of the housing body 10 is located inner than a corresponding end portion of the housing body 10 in the axial direction thereof, which inhibits the length of the shaft body 20.

The faucet valve apparatus 100 of the present embodiment further includes a hot-water/cold-water stop unit which stops a supply of the hot water and/or the cold water. As the hot-water/cold-water stop unit is provided separately (additionally), the supply of the hot water and/or the cold water can be surely stopped, even if a perfect sealing performance is not provided in order to prioritize to keep a sliding resistance of the cylinder body 30 to the minimum and to reduce a torque required for the flow rate regulation and/or the temperature regulation.

Specifically, the hot-water/cold-water stop unit has a cold-water stop unit 11s provided on an upstream side of the cold water supply channel, and a hot-water stop unit 13s provided on an upstream side of the hot water supply channel (see FIG. 2). Thereby, it can be prevented that one of the hot water and the cold water flows back to the upstream side of the other thereof.

Next, an operation of the faucet valve apparatus 100 of the present embodiment is explained. According to the above structure, the cylinder body 30 of the present embodiment is affected by a rotational operation of the first operation part 41 in such a manner that the rotational position of the cylindrical body 30 is changed while the axial position of the cylindrical body 30 is not changed, and is affected by a rotational operation of the second operation part 51 in such a manner that the axial position of the cylindrical body 30 is changed while the rotational position of the cylindrical body 30 is not changed.

Depending on the axial position and the rotational position of the cylinder body 30, the communication amount between the cold-water assist pipe member 16 (cold water supply channel) and the cold water inlet hole 34 and the communication amount between the hot-water assist pipe member 18 (hot water supply channel) and the hot water inlet hole 35 are changed. Thereby, both a temperature regulation and a flow rate regulation can be achieved. In the present embodiment, the mixed water outlet hole 36 and the mixed water outlet channel are always maintained to be well communicated with each other. FIG. 9 is a schematic view showing a state in which the cold-water assist pipe member 16 and the hot-water assist pipe member 18 are in contact with the cylinder body 30.

In addition, in the present embodiment, a ratio between the communication amount between the cold-water assist pipe member 16 (cold water supply channel) and the cold water inlet hole 34 and the communication amount between the hot-water assist pipe member 18 (hot water supply channel) and the hot water inlet hole 35 is changed by a rotational operation of the first operation part 41 in order to achieve the temperature regulation. On the other hand, a total communication amount summed up by adding the communication amount between the cold-water assist pipe member 16 (cold water supply channel) and the cold water inlet hole 34 and the communication amount between the hot-water assist pipe member 18 (hot water supply channel) and the hot water inlet hole 35 is changed by a rotational operation of the second operation part 51 in order to achieve the flow rate regulation.

FIGS. 10A to 10G are schematic explanatory views for a position control of the cylinder body 30 according to the present embodiment. In the present embodiment, the temperature regulation is achieved depending on the rotational position of the cylinder body 30 and the flow rate regulation is achieved depending on the axial position of the cylinder body 30.

FIG. 10A schematically shows the position of the cold water inlet hole 34 and the position of the hot water inlet hole 35 in the circumferential wall 33 of the cylinder body 30.

Figure 10B:
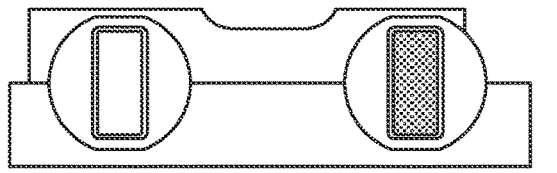
FIG. 10B is another schematic explanatory view showing the case in which the temperature regulation is achieved depending on the rotational position of the cylinder body and the flow rate regulation is achieved depending on the axial position of the cylinder body.

FIG. 10B schematically shows a state in which the communication amount between the cold-water assist pipe member 16 (cold water supply channel) and the cold water inlet hole 34 is maximal while the communication between the hot-water assist pipe member 18 (hot water supply channel) and the hot water inlet hole 35 is interrupted. In this state, the mixed water supplied through the mixed water outlet hole 36 and the mixed water outlet channel consists of the cold water of 100% and the hot water of 0% (the flow rate of the mixed water is 100%).

Figure 10C:
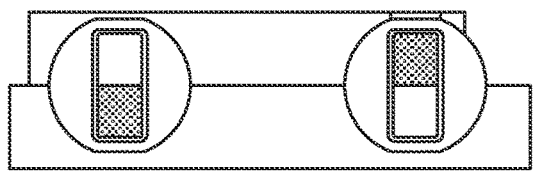
FIG. 10C is further another schematic explanatory view showing the case in which the temperature regulation is achieved depending on the rotational position of the cylinder body and the flow rate regulation is achieved depending on the axial position of the cylinder body.

FIG. 10C schematically shows a state in which the rotational position of the shaft body 20 and the cylindrical body 30 has been changed by a rotational operation of the first operation part 41 from the state shown in FIG. 10B, and in which the communication amount between the cold-water assist pipe member 16 (cold water supply channel) and the cold water inlet hole 34 is 50% and the communication amount between the hot-water assist pipe member 18 (hot water supply channel) and the hot water inlet hole 35 is also 50%. In this state, the mixed water supplied through the mixed water outlet hole 36 and the mixed water outlet channel consists of the cold water of 50% and the hot water of 50% (the flow rate of the mixed water is 100%).

Figure 10D:
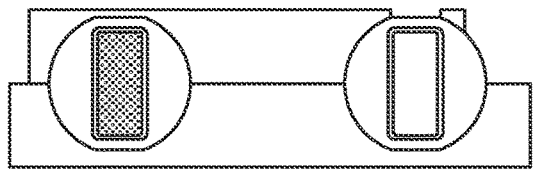
FIG. 10D is further another schematic explanatory view showing the case in which the temperature regulation is achieved depending on the rotational position of the cylinder body and the flow rate regulation is achieved depending on the axial position of the cylinder body.

FIG. 10D schematically shows a state in which the rotational position of the shaft body 20 and the cylindrical body 30 has been changed by a rotational operation of the first operation part 41 from the state shown in FIG. 10C, and in which the communication between the cold-water assist pipe member 16 (cold water supply channel) and the cold water inlet hole 34 is interrupted while the communication amount between the hot-water assist pipe member 18 (hot water supply channel) and the hot water inlet hole 35 is maximal. In this state, the mixed water supplied through the mixed water outlet hole 36 and the mixed water outlet channel consists of the cold water of 0% and the hot water of 100% (the flow rate of the mixed water is 100%).

Figure 10E:
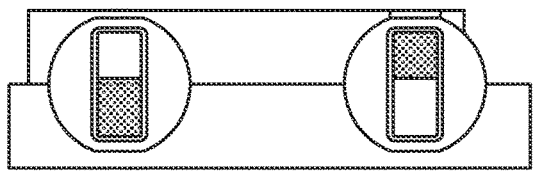
FIG. 10E is further another schematic explanatory view showing the case in which the temperature regulation is achieved depending on the rotational position of the cylinder body and the flow rate regulation is achieved depending on the axial position of the cylinder body.

FIG. 10E schematically shows a state in which the rotational position of the shaft body 20 and the cylindrical body 30 has been changed by a rotational operation of the first operation part 41 from the state shown in FIG. 10C, and in which the communication amount between the cold-water assist pipe member 16 (cold water supply channel) and the cold water inlet hole 34 is 45% and the communication amount between the hot-water assist pipe member 18 (hot water supply channel) and the hot water inlet hole 35 is 55%. In this state, the mixed water supplied through the mixed water outlet hole 36 and the mixed water outlet channel consists of the cold water of 45% and the hot water of 55% (the flow rate of the mixed water is 100%).

Figure 10F:
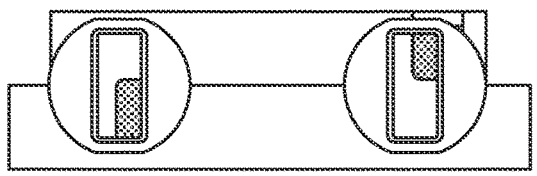
FIG. 10F is further another schematic explanatory view showing the case in which the temperature regulation is achieved depending on the rotational position of the cylinder body and the flow rate regulation is achieved depending on the axial position of the cylinder body.

FIG. 10F schematically shows a state in which the axial position of the shaft body 20 and the cylindrical body 30 has been changed by a rotational operation of the second operation part 51 from the state shown in FIG. 10E, and in which the communication amount between the cold-water assist pipe member 16 (cold water supply channel) and the cold water inlet hole 34 is 22.5% and the communication amount between the hot-water assist pipe member 18 (hot water supply channel) and the hot water inlet hole 35 is 27.5%. In this state, the mixed water supplied through the mixed water outlet hole 36 and the mixed water outlet channel consists of the cold water of 45% and the hot water of 55% although the flow rate of the mixed water is 50%.

Figure 10G:
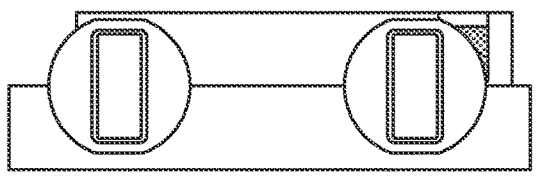
FIG. 10G is further another schematic explanatory view showing the case in which the temperature regulation is achieved depending on the rotational position of the cylinder body and the flow rate regulation is achieved depending on the axial position of the cylinder body.

FIG. 10G schematically shows a state in which the axial position of the shaft body 20 and the cylindrical body 30 has been changed by a rotational operation of the second operation part 51 from the state shown in FIG. 10F, and in which the communication between the cold-water assist pipe member 16 (cold water supply channel) and the cold water inlet hole 34 is interrupted and the communication between the hot-water assist pipe member 18 (hot water supply channel) and the hot water inlet hole 35 is also interrupted. In this state, the mixed water supplied through the mixed water outlet hole 36 and the mixed water outlet channel consists of the cold water of 0% and the hot water of 0% (the flow rate of the mixed water is 0%).

As shown in FIGS. 10A to 10G, according to the present embodiment, the ratio of the communication amount between the cold-water assist pipe member 16 (cold water supply channel) and the cold water inlet hole 34 with respect to the communication amount between the hot-water assist pipe member 18 (hot water supply channel) and the hot water inlet hole 35 is changed by a rotational operation of the first operation part 41 in order to achieve the temperature regulation, and the total communication amount summed up by adding the communication amount between the cold-water assist pipe member 16 (cold water supply channel) and the cold water inlet hole 34 and the communication amount between the hot-water assist pipe member 18 (hot water supply channel) and the hot water inlet hole 35 is changed by a rotational operation of the second operation part 51 in order to achieve the flow rate regulation.

In addition, the first operation part 41 and the second operation part 51 are rotationally operable at the same time. When the first operation part 41 and the second operation part 51 are rotationally operated at the same time, the shaft body 20 and the cylinder body 30 are affected thereby in such a manner the rotational position of the shaft body 20 and the cylinder body 30 is changed while the axial position of the shaft body 20 and the cylinder body 30 is changed. According to the above feature, since the first operation part 41 and the second operation part 51 are operable at the same time, the temperature regulation and the flow rate regulation can be achieved more quickly.

The function of the first operation part 41 and the function of the second operation unit 51 in the above embodiment can be interchanged with each other by changing the position of the cold water inlet hole 34 and the position of the hot water inlet hole 35. Specifically, the total communication amount summed up by adding the communication amount between the cold-water assist pipe member 16 (cold water supply channel) and the cold water inlet hole 34 and the communication amount between the hot-water assist pipe member 18 (hot water supply channel) and the hot water inlet hole 35 may be changed by a rotational operation of the first operation part 41 in order to achieve the flow rate regulation, and the ratio of the communication amount between the cold-water assist pipe member 16 (cold water supply channel) and the cold water inlet hole 34 with respect to the communication amount between the hot-water assist pipe member 18 (hot water supply channel) and the hot water inlet hole 35 may be changed by a rotational operation of the second operation part 51 in order to achieve the temperature regulation.

In such a modified example, for example, the cold water inlet hole 34 may be opened between 0° and 90° with respect to the circumferential angle (as measured around the axis of the cylinder body 30), and may be located at an axial region a certain distance away from the right end of the cylinder body 30.

Then, for example, the hot water inlet hole 35 may be opened between 0° and 90° with respect to the circumferential angle (i.e., opened at the same angular region as that of the cold water inlet hole 34), and may be located at an axial region a certain distance away from the left end of the cylinder body 30.

FIGS. 11A to 11G are schematic explanatory views for a position control of the cylinder body 30 according to the modified example. In the present modified example, the temperature regulation is achieved depending on the axial position of the cylinder body 30 and the flow rate regulation is achieved depending on the rotational position of the cylinder body 30.

FIG. 11A schematically shows the position of the cold water inlet hole 34 and the position of the hot water inlet hole 35 in the circumferential wall 33 of the cylinder body 30.

Figure 11B:
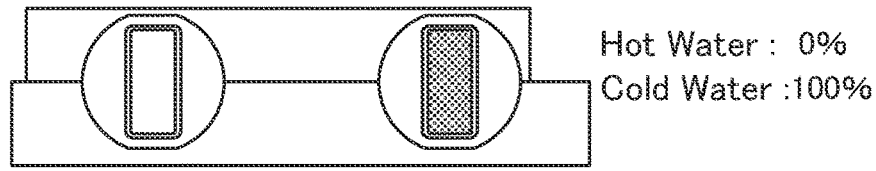
FIG. 11B is another schematic explanatory view showing the case in which the temperature regulation is achieved depending on the axial position of the cylinder body and the flow rate regulation is achieved depending on the rotational position of the cylinder body.

FIG. 11B schematically shows a state in which the communication amount between the cold-water assist pipe member 16 (cold water supply channel) and the cold water inlet hole 34 is maximal while the communication between the hot-water assist pipe member 18 (hot water supply channel) and the hot water inlet hole 35 is interrupted. In this state, the mixed water supplied through the mixed water outlet hole 36 and the mixed water outlet channel consists of the cold water of 100% and the hot water of 0% (the flow rate of the mixed water is 100%).

Figure 11C:
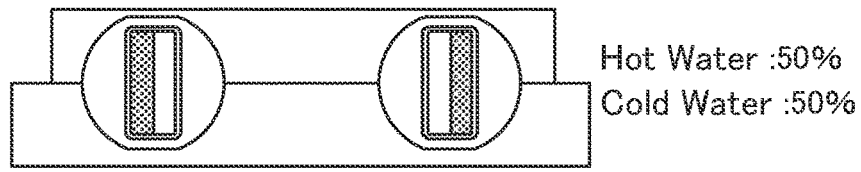
FIG. 11C is further another schematic explanatory view showing the case in which the temperature regulation is achieved depending on the axial position of the cylinder body and the flow rate regulation is achieved depending on the rotational position of the cylinder body.

FIG. 11C schematically shows a state in which the axial position of the shaft body 20 and the cylindrical body 30 has been changed by a rotational operation of the second operation part 51 from the state shown in FIG. 11B, and in which the communication amount between the cold-water assist pipe member 16 (cold water supply channel) and the cold water inlet hole 34 is 50% and the communication amount between the hot-water assist pipe member 18 (hot water supply channel) and the hot water inlet hole 35 is also 50%. In this state, the mixed water supplied through the mixed water outlet hole 36 and the mixed water outlet channel consists of the cold water of 50% and the hot water of 50% (the flow rate of the mixed water is 100%).

Figure 11D:
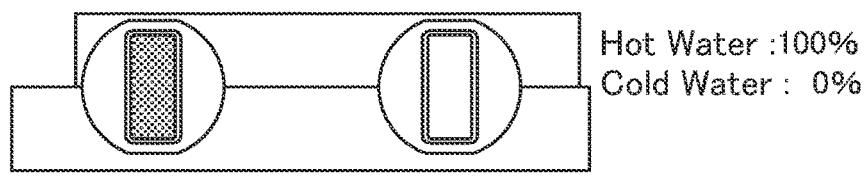
FIG. 11D is further another schematic explanatory view showing the case in which the temperature regulation is achieved depending on the axial position of the cylinder body and the flow rate regulation is achieved depending on the rotational position of the cylinder body.

FIG. 11D schematically shows a state in which the axial position of the shaft body 20 and the cylindrical body 30 has been changed by a rotational operation of the second operation part 51 from the state shown in FIG. 11C, and in which the communication between the cold-water assist pipe member 16 (cold water supply channel) and the cold water inlet hole 34 is interrupted while the communication amount between the hot-water assist pipe member 18 (hot water supply channel) and the hot water inlet hole 35 is maximal. In this state, the mixed water supplied through the mixed water outlet hole 36 and the mixed water outlet channel consists of the cold water of 0% and the hot water of 100% (the flow rate of the mixed water is 100%).

Figure 11E:
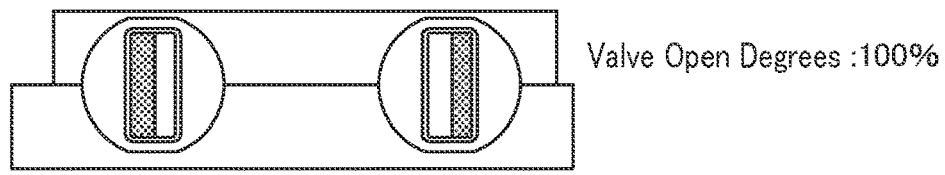
FIG. 11E is further another schematic explanatory view showing the case in which the temperature regulation is achieved depending on the axial position of the cylinder body and the flow rate regulation is achieved depending on the rotational position of the cylinder body.

FIG. 11E schematically shows a state in which the axial position of the shaft body 20 and the cylindrical body 30 has been changed by a rotational operation of the second operation part 51 from the state shown in FIG. 11C, and in which the communication amount between the cold-water assist pipe member 16 (cold water supply channel) and the cold water inlet hole 34 is 45% and the communication amount between the hot-water assist pipe member 18 (hot water supply channel) and the hot water inlet hole 35 is 55%. In this state, the mixed water supplied through the mixed water outlet hole 36 and the mixed water outlet channel consists of the cold water of 45% and the hot water of 55% (the flow rate of the mixed water is 100%).

Figure 11F:
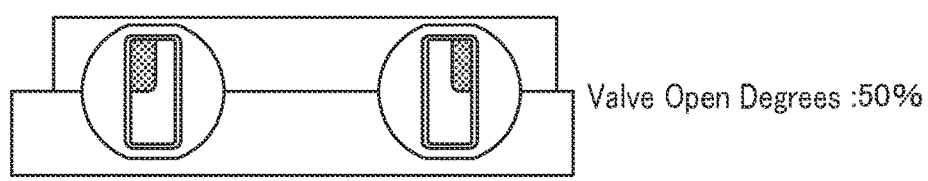
FIG. 11F is further another schematic explanatory view showing the case in which the temperature regulation is achieved depending on the axial position of the cylinder body and the flow rate regulation is achieved depending on the rotational position of the cylinder body.

FIG. 11F schematically shows a state in which the rotational position of the shaft body 20 and the cylindrical body 30 has been changed by a rotational operation of the first operation part 41 from the state shown in FIG. 11E, and in which the communication amount between the cold-water assist pipe member 16 (cold water supply channel) and the cold water inlet hole 34 is 22.5% and the communication amount between the hot-water assist pipe member 18 (hot water supply channel) and the hot water inlet hole 35 is 27.5%. In this state; the mixed water supplied through the mixed water outlet hole 36 and the mixed water outlet channel consists of the cold water of 45% and the hot water of 55% although the flow rate of the mixed water is 50%.

Figure 11G:
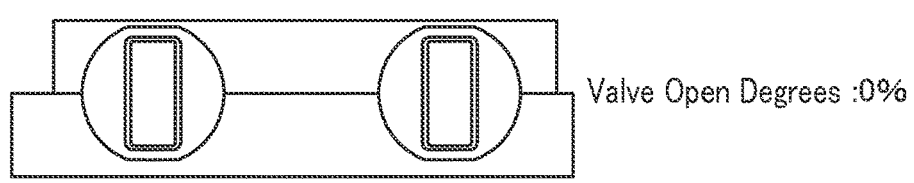
FIG. 11G is further another schematic explanatory view showing the case in which the temperature regulation is achieved depending on the axial position of the cylinder body and the flow rate regulation is achieved depending on the rotational position of the cylinder body.

FIG. 11G schematically shows a state in which the rotational position of the shaft body 20 and the cylindrical body 30 has been changed by a rotational operation of the first operation part 41 from the state shown in FIG. 11F, and in which the communication between the cold-water assist pipe member 16 (cold water supply channel) and the cold water inlet hole 34 is interrupted and the communication between the hot-water assist pipe member 18 (hot water supply channel) and the hot water inlet hole 35 is also interrupted. In this state, the mixed water supplied through the mixed water outlet hole 36 and the mixed water outlet channel consists of the cold water of 0% and the hot water of 0% (the flow rate of the mixed water is 0%).

As shown in FIGS. 11A to 11G, according to the present modified example, the ratio of the communication amount between the cold-water assist pipe member 16 (cold water supply channel) and the cold water inlet hole 34 with respect to the communication amount between the hot-water assist pipe member 18 (hot water supply channel) and the hot water inlet hole 35 is changed by a rotational operation of the second operation part 51 in order to achieve the temperature regulation, and the total communication amount summed up by adding the communication amount between the cold-water assist pipe member 16 (cold water supply channel) and the cold water inlet hole 34 and the communication amount between the hot-water assist pipe member 18 (hot water supply channel) and the hot water inlet hole 35 is changed by a rotational operation of the first operation part 41 in order to achieve the flow rate regulation.

As described above, according to the faucet valve apparatus 100 of the above embodiment, depending on the axial position and the rotational position of the common cylinder body 30, both the temperature regulation and the flow rate regulation can be achieved. This makes it possible to design the faucet valve apparatus 100 of the above embodiment as a compact faucet valve apparatus. In addition, there is no obstacle in electrification of the first operation part 41 and in electrification of the second operation part 51. That is to say, the faucet valve apparatus 100 of the above embodiment is suitable for achieving electrification of both the temperature regulation and the flow rate regulation.

In addition, according to the faucet valve apparatus 100 of the above embodiment, the ratio of the communication amount between the cold-water assist pipe member 16 (cold water supply channel) and the cold water inlet hole 34 with respect to the communication amount between the hot-water assist pipe member 18 (hot water supply channel) and the hot water inlet hole 35 is changed by a rotational operation of the first operation part 41 in order to achieve the temperature regulation, and the total communication amount summed up by adding the communication amount between the cold-water assist pipe member 16 (cold water supply channel) and the cold water inlet hole 34 and the communication amount between the hot-water assist pipe member 18 (hot water supply channel) and the hot water inlet hole 35 is changed by a rotational operation of the second operation part 51 in order to achieve the flow rate regulation.

Herein, it is possible to interchange the function of the first operation part 41 and the function of the second operation part 51 with each other by changing the position of the cold water inlet hole 34 and the position of the hot water inlet hole 35, That is to say, the ratio of the communication amount between the cold-water assist pipe member 16 (cold water supply channel) and the cold water inlet hole 34 with respect to the communication amount between the hot-water assist pipe member 18 (hot water supply channel) and the hot water inlet hole 35 may be changed by a rotational operation of the second operation part 51 in order to achieve the temperature regulation, and the total communication amount summed up by adding the communication amount between the cold-water assist pipe member 16 (cold water supply channel) and the cold water inlet hole 34 and the communication amount between the hot-water assist pipe member 18 (hot water supply channel) and the hot water inlet hole 35 may be changed by a rotational operation of the first operation part 41 in order to achieve the flow rate regulation.

In addition, the faucet valve apparatus 100 of the above embodiment is provided with the shaft body 20, which is affected by a rotational operation of the first operation part 41 in such a manner that the rotational position of the shaft body 20 is changed while the axial position of the shaft body 20 is not changed and which is affected by a rotational operation of the second operation part 51 in such a manner that the axial position of the shaft body 20 is changed while the rotational position of the shaft body 20 is not changed. In addition, the cylinder body 30 is fixed (connected) to the shaft body 20. Therefore, a control for changing the position of the cylinder body 30 is achieved by a relatively simple structure which serves for a control for changing the position of the shaft body 20.

In addition, according to the faucet valve apparatus 100 of the above embodiment, the first operation part 41 and the second operation part 51 are rotationally operable at the same time, and when the first operation part 41 and the second operation part 51 are rotationally operated at the same time, the shaft body 20 and the cylinder body 30 are affected thereby in such a manner the rotational position of the shaft body 20 and the cylinder body 30 is changed while the axial position of the shaft body 20 and the cylinder body 30 is changed. According to this feature, when the first operation part 41 and the second operation part 51 are operated at the same time, the temperature regulation and the flow rate regulation can be achieved more quickly.

In addition, the faucet valve apparatus 100 of the above embodiment is provided with the slider cylinder 43 serving as a first connection member, which is fixed (connected) to the shaft body 20 and which is fixed to the first operation part 41 with respect to the rotational direction thereof, and the slider cylinder 43 is movable against the first operation part 41 with respect to the axial direction thereof. According to this feature, a rotational operation of the first operation part 41 can be surely transferred as a rotating force for the shaft body 20, while the existence of the slider cylinder 43 does not obstruct an operation of the second operation part 51.

In addition, the faucet valve apparatus 100 of the above embodiment is provided with the rotation cylinder 52 serving as a direction conversion member, which is configured to convert a rotational operating force of the second operation part 51 to an axial moving force, and with the external thread body 53 and the retaining rings 58 serving as a second connection member, which are fixed to the shaft body 20 with respect to the axial direction thereof while allowing their relative rotation and which are configured to receive the axial moving force converted by the rotation cylinder 52. According to this feature, a rotational operation of the second operation part 51 can be surely transferred as an axial moving force for the shaft body 20.

In addition, the faucet valve apparatus 100 of the above embodiment is provided with the projection region 54*p* of the holding ring 54 serving as a regulation member, which is capable of regulating the rotatable range of the second operation part 51 in a desired manner. According to this feature, a regulation of the movable range of the axial position of the cylinder body 30 against the housing body 10 can be achieved by a regulation of the rotatable range of the second operation part 51 by the projection region 54*p* of the holding ring 54. Thus, even when there is variation between products of each structural element based on a manufacturing error or the like, the flow rate regulation and/or the temperature regulation can be achieved in a desired manner.

In addition, according to the faucet valve apparatus 100 of the above embodiment, the shaft body 20 extends through the cylinder body 30 in the axial direction thereof, and both the ends of the shaft body 20 are located in the region which is not communicated with the inside space of the housing body 10 and are exposed to the atmosphere. According to this feature, the influence which the water pressure in the inside space of the housing body 10 has on the shaft body 20 is remarkably inhibited. Thus, the torque (force) required to cause the shaft body 20 to rotate or move in the axial direction thereof can be made smaller. This is very convenient for achieving the electrification.

In particular, according to the faucet valve apparatus 100 of the above embodiment, the left end of the shaft body 20 is shielded by the slide bearing (bush) 46*b* and the X-ring 47*b* in order not to be communicated with inside space of the housing body 10, and the right end of the shaft body 20 is shielded by the slide bearing (bush) 56*b* and the X-ring 57*b* in order not to be communicated with inside space of the housing body 10. Thereby, the influence which the water pressure in the inside space of the housing body 10 has on the shaft body 20 is inhibited extremely effectively. In addition, the shielded (sealed) parts of the shaft body 20 on both the right and left sides, which are shielded in order not to be communicated with inside space of the housing body 10, have the same diameter. Thus, the water pressured exerted on both the parts are canceled.

Furthermore, according to the faucet valve apparatus 100 of the above embodiment, both the ends of the shaft body 20 are maintained to be exposed to the atmosphere even when the axial position of the shaft body 20 is changed by a rotational operation of the second operation part 51. According to this feature, even when the axial position of the shaft body 20 is changed, the torque required for each of the first operation part 41 and the second operation part 51 can be made smaller. This is very convenient for achieving the electrification.

In addition, the faucet valve apparatus 100 of the above embodiment is provided with the left side lid member 47 and the right side lid member 57 in order to define the inside space of the housing body 10. Therefore, by removing the left side lid member 47 and/or the right side lid member 57, it is easy to assemble and/or disassemble (for example, for a maintenance operation) the structural elements in the housing body 10.

Furthermore, according to the faucet valve apparatus 100 of the above embodiment, each of the left side lid member 47 and the right side lid member 57 is located inner than a corresponding end portion of the housing body 10 in the axial direction thereof. Thus, the length of the shaft body 20 is inhibited. This is convenient for making the faucet valve apparatus 100 compact.

In addition, according to the faucet valve apparatus 100 of the above embodiment, there is no elastic member (so-called packing), for example made of rubber, between the housing body 10 and the cylinder body 30. Instead, the housing body 10 and the cylinder body 30 are in a direct contact with each other so as to provide a certain sealing performance, which reduces a risk that an action (movement) of the cylinder body 30 in the housing body 10 is obstructed in an undesired manner. This also contributes to the effects that the torque (force) required to change the axial position and/or the rotation position of the cylinder body 30 can be made smaller.

In addition, according to the faucet valve apparatus 100 of the above embodiment, depending on the water pressure difference between the one side of the cold-water assist pipe member 16 and the other side thereof, the cold-water assist pipe member 16 can be brought into contact with the circumferential wall 33 of the cylinder body 30 and cab be communicated with the cold water inlet hole 34. Similarly, depending on the water pressure difference between the one side of the hot-water assist pipe member 18 and the other side thereof, the hot-water assist pipe member 18 can be brought into contact with the circumferential wall 33 of the cylinder body 30 and cab be communicated with the hot water inlet hole 35. Thereby, the supply of the cold water into the cylinder body 30 and/or the supply of the hot water into the cylinder body 30 can be surely assisted, and it is unnecessary to interpose an elastic member, for example made of rubber, between the housing body 10 and the cylinder body 30. This also contributes to the effects that the torque (force) required to change the axial position and/or the rotation position of the cylinder body 30 can be made smaller.

In addition, according to the faucet valve apparatus 100 of the above embodiment, the cold-water assist pipe member 16 has the movement regulating part (flange part 16f), which regulates the movable (slidable) stroke of the cold-water assist pipe member 16 with respect to the cold water supply channel, and the hot-water assist pipe member 18 has also the movement regulating part (flange part 18f), which regulates the movable (slidable) stroke of the hot-water assist pipe member 18 with respect to the hot water supply channel. Thereby, the movable (slidable) stroke of each of the cold-water assist pipe member 16 and the hot-water assist pipe member 18 is regulated within a desired range. That is to say, it is prevented that the cold-water assist pipe member 16 and/or the hot-water assist pipe member 18 moves (projects) toward the cylinder body 30 more than necessary.

In particular, according to the faucet valve apparatus 100 of the above embodiment, the movement regulating part of the cold-water assist pipe member 16 is provided as the flange part 16f, and the movement regulating part of the hot-water assist pipe member 18 is also provided as the flange part 18f. That is to say, these movement regulating parts are provided in a relatively simple manner.

In addition, according to the faucet valve apparatus 100 of the above embodiment, the hardness of the upper surface 16r of the cold-water assist pipe member 16 and the hardness of the upper surface 18r of the hot-water assist pipe member 18 are smaller than that of the circumferential wall 33 of the cylinder body 30. Thus, it is inhibited that the circumferential wall 33 of the cylinder body 30 is worn down in an undesired manner. On the other hand, it is preferable that the upper surface 16r of the cold-water assist pipe member 16 and the upper surface 18r of the hot-water assist pipe member 18 are rather worn down so as to align with (follow) the circumferential wall 33 of the cylinder body 30.

In particular, according to the faucet valve apparatus 100 of the above embodiment, the circumferential wall 33 of the cylinder body 30 is a cylindrical surface having a certain curvature radius (15 mm/2=7.5 mm), the upper surface 16r of the cold-water assist pipe member 16 is a part of a cylindrical surface having a certain curvature radius (10 mm), the upper surface 18r of the hot-water assist pipe member 18 is a part of a cylindrical surface having a certain curvature radius (10 mm), and the curvature radius of the upper surface 16r of the cold-water assist pipe member 16 and the curvature radius of the upper surface 18r of the hot-water assist pipe member 18 are greater than the curvature radius of the circumferential wall 33 of the cylinder body 30. Thereby, it is avoided that only both the ends of the upper surface 16r of the cold-water assist pipe member 16 in the arc direction thereof are brought into contact with the cylinder body 30 and only both the ends of the upper surface 18r of the hot-water assist pipe member 18 in the arc direction thereof are brought into contact with the cylinder body 30 (ensured is the situation in which the middle portion of the upper surface 16r of the cold-water assist pipe member 16 in the arc direction thereof is brought into contact with the cylinder body 30 and in which the middle portion of the upper surface 18r of the hot-water assist pipe member 18 in the arc direction thereof is also brought into contact with the cylinder body 30). Therefore, a more closely contact between the upper surface 16r of the cold-water assist pipe member 16 and the cylinder body 30 is achieved, and a more closely contact between the upper surface 18r of the hot-water assist pipe member 18 and the cylinder body 30 is also achieved.

In addition, the faucet valve apparatus 100 of the above embodiment is provided with the hot-water/cold-water stop unit, which stops the supply of the hot water and/or the cold water. Thereby, the supply of the hot water and/or the cold water can be surely stopped, even in a case wherein the supply is not perfectly stopped by regulating the flow rate to the minimum by means of the function of the achieved flow rate regulation (even in a case wherein a perfect sealing performance is not provided in the situation in which the communication has been controlled to be interrupted).

In particular, according to the faucet valve apparatus 100 of the above embodiment, the hot-water/cold-water stop unit consists of the cold-water stop unit 11s provided on the upstream side of the cold water supply channel, and the hot-water stop unit 13s provided on the upstream side of the hot water supply channel, so that it is prevented that one of the hot water and the cold water flows back to the upstream side of the other thereof.

With reference to the attached drawings, we explain a faucet valve apparatus according to a second embodiment of the present invention. The faucet valve apparatus 200 of the second embodiment is a faucet valve apparatus which is suitable for achieving electrification of a temperature regulation.

Figure 12:
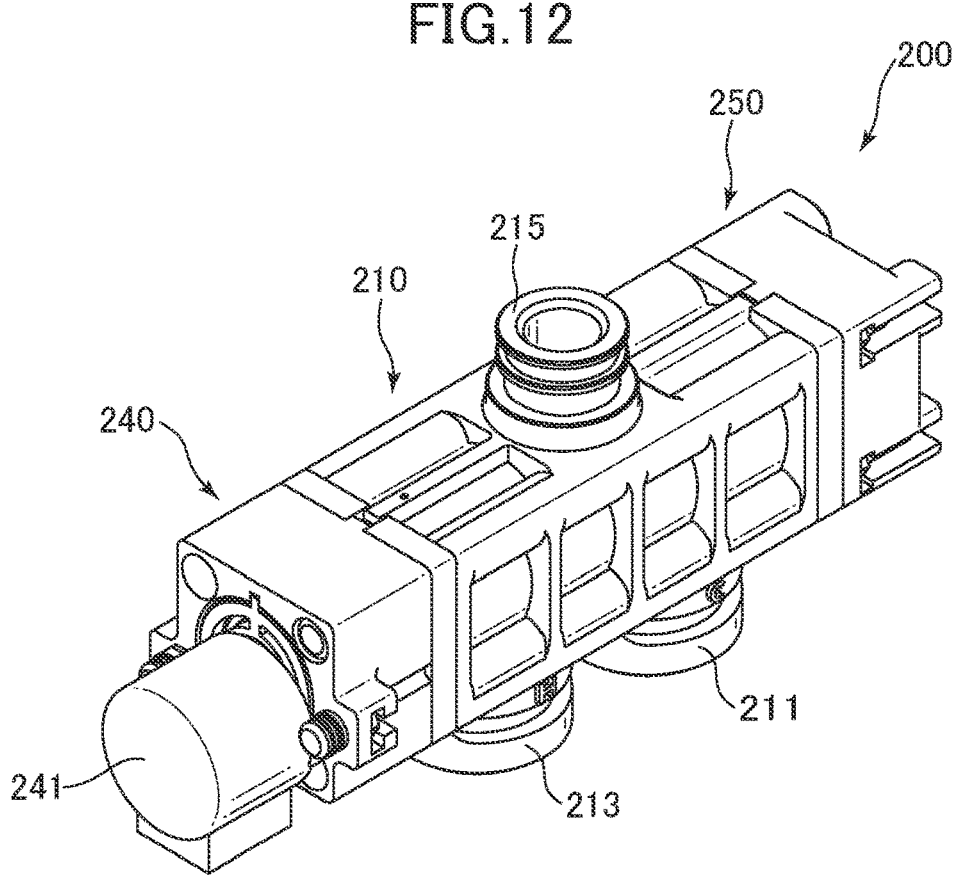
FIG. 12 is a schematic perspective view showing a faucet valve apparatus according to a second embodiment of the present invention.
Figure 13:
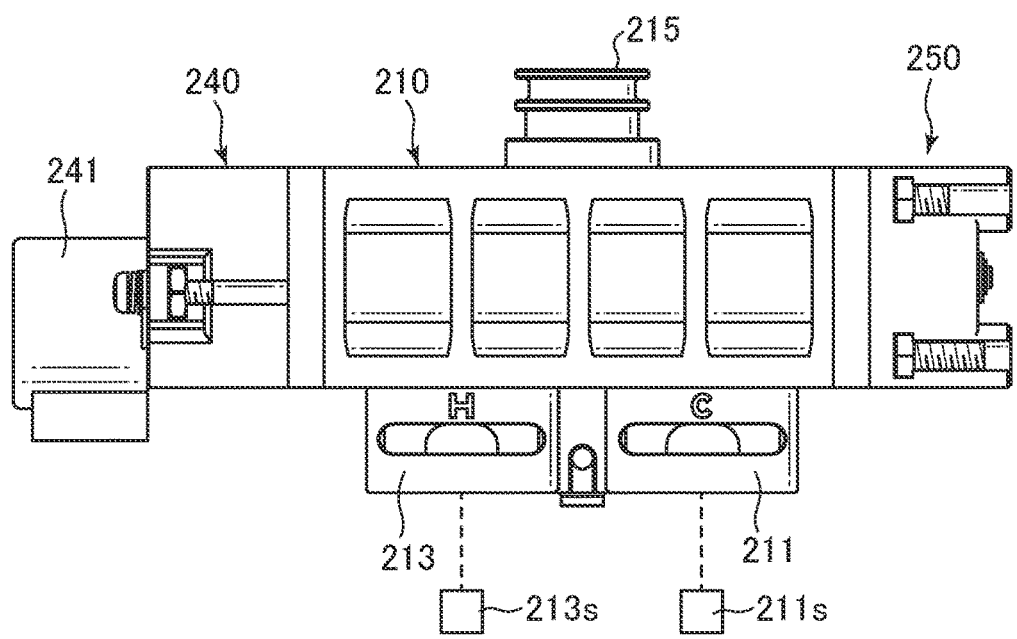
FIG. 13 is a schematic front view showing the faucet valve apparatus according to the second embodiment of the present invention.
Figure 14:
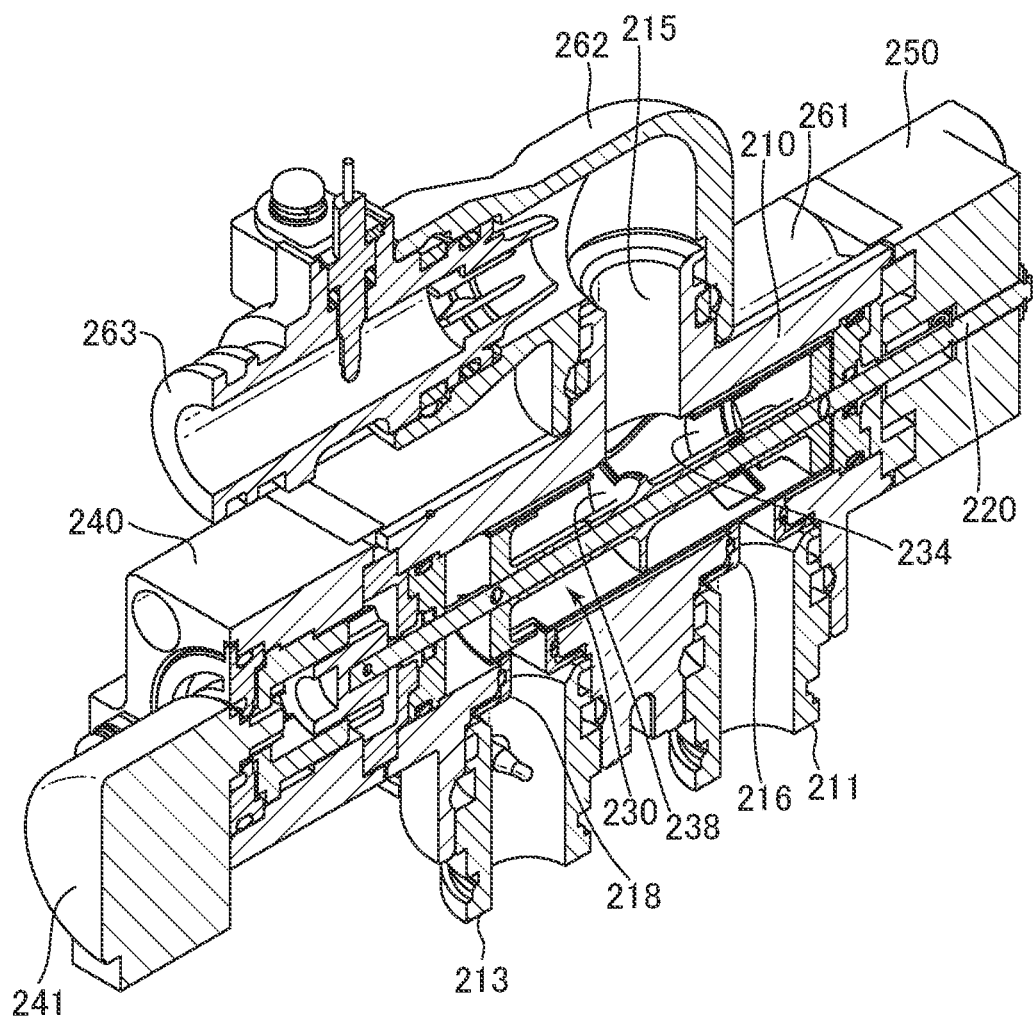
FIG. 14 is a schematic longitudinal sectional perspective view showing the faucet valve apparatus according to the second embodiment of the present invention.
Figure 15:
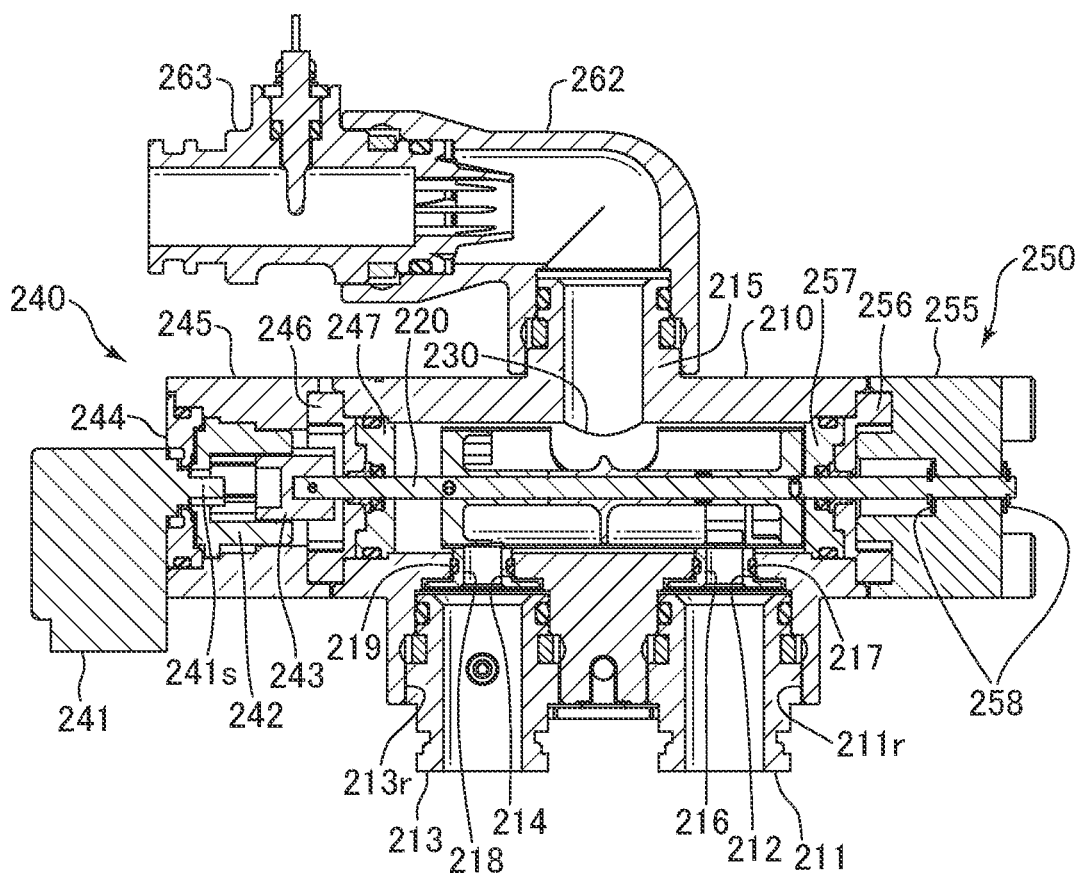
FIG. 15 is a schematic longitudinal sectional view showing the faucet valve apparatus according to the second embodiment of the present invention.
Figure 16:
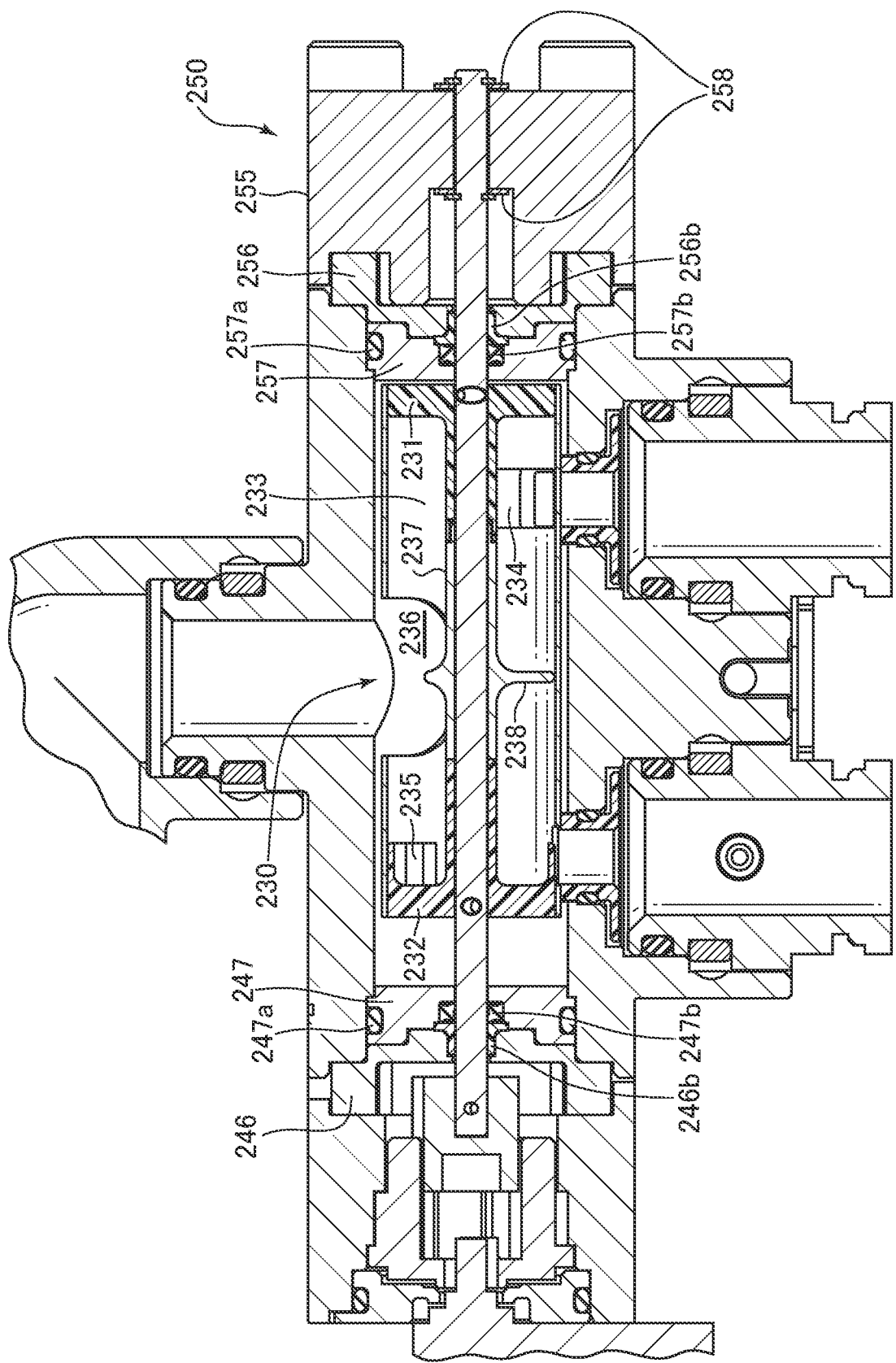
FIG. 16 is an enlarged view of the cylinder body shown in FIG. 15.
Figure 17:
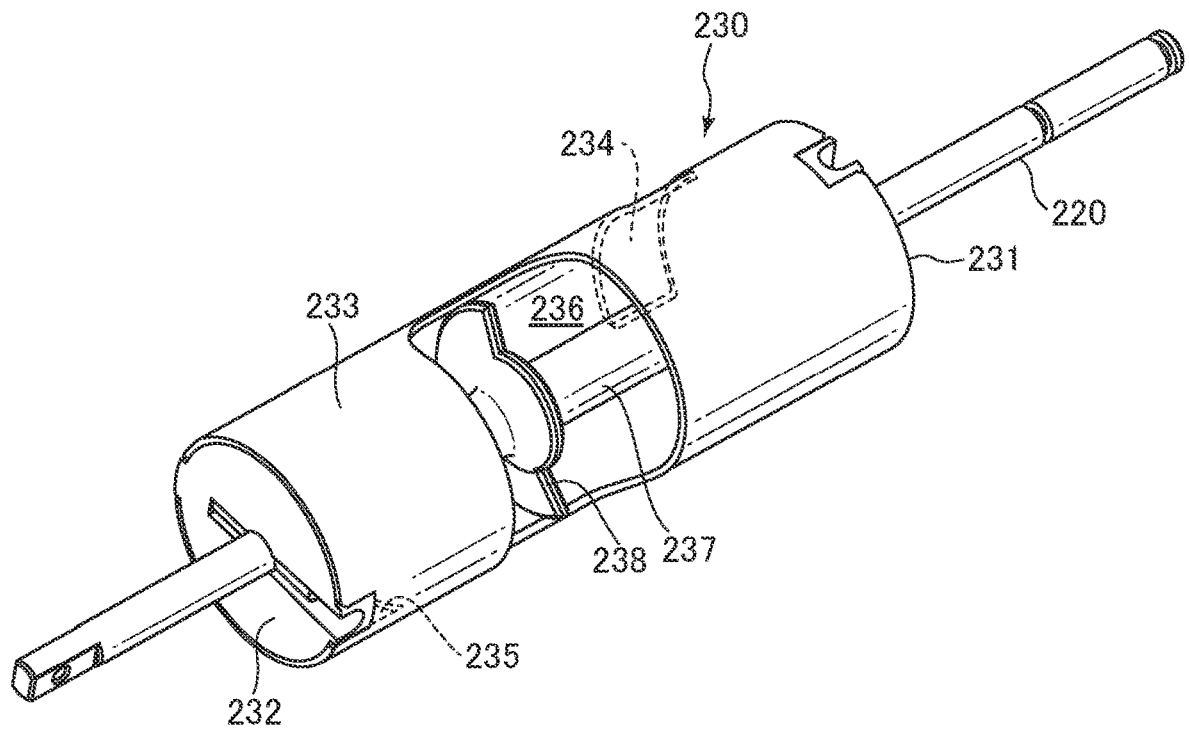
FIG. 17 is a schematic perspective view showing the cylinder body and the shaft body, separated from the other structure, according to the second embodiment of the present invention.

FIG. 12 is a schematic perspective view showing the faucet valve apparatus 200 according to the second embodiment of the present invention. FIG. 13 is a schematic front view showing the faucet valve apparatus 200 according to the second embodiment. FIG. 14 is a schematic longitudinal sectional perspective view showing the faucet valve apparatus 200 according to the second embodiment. FIG. 15 is a schematic longitudinal sectional view showing the faucet valve apparatus 200 according to the second embodiment. FIG. 16 is an enlarged view of a cylinder body 230 shown in FIG. 15. FIG. 17 is a schematic perspective view showing the cylinder body 230 and a shaft body 220, separated from the other structure, according to the second embodiment.

As shown in FIGS. 12 to 17, the faucet valve apparatus 200 according to the second embodiment includes: a cylinder body 230 having a hollow cylindrical shape; and a housing body 210 containing the cylinder body 230 in a rotatable manner. For example, the cylinder body 230 has an outer diameter of 15 mm, a thickness of 0.5 mm and an axial length of 50 mm, and is made of stainless steel. Alternatively, the cylinder body 230 may be made of a resin material. In the latter case, it is preferable that a thickness of the cylinder body 230 is greater than in the former case. In particular, with reference to FIG. 16, a right end wall 231 made of a resin is fitted in a right end of the cylinder body 230, and a left end wall 232 made of a resin is fitted in a left end of the cylinder body 230. A cold water inlet hole 234, which has a substantially rectangular shape, is formed in a right side region of a circumferential wall 233 of the cylinder body 230. For example, the cold water inlet hole 234 is provided between 0° (which is used as a criterion for angular positions in the hereinafter explanation) and 90° with respect to a circumferential angle (as measured around an axis of the cylinder body 230). The cold water inlet hole 234 is located at an axial region a certain distance away from the right end of the cylinder body 230.

A hot water inlet hole 235, which has a substantially rectangular shape, is formed in a left side region of the circumferential wall 233 of the cylinder body 230. For example, the hot water inlet hole 235 is provided between 90° and 180° with respect to the circumferential angle (as measured around the axis of the cylinder body 230). That is to say, the hot water inlet hole 235 is provided at an angular region different from that of the cold water inlet hole 234. The hot water inlet hole 235 is located at an axial region a certain distance away from the left end of the cylinder body 230.

A mixed water outlet hole 236 is formed in a substantially middle region of the circumferential wall 233 of the cylinder body 230 in an axial direction thereof. In addition, the cylinder body 230 of the present embodiment has a center pipe 237, which extends from the right end wall 231 to the left end wall 232. A partition wall 238 extends radially outwardly from the center pipe 237 at an axial position corresponding to the mixed water outlet hole 236 of the cylinder body 230 (see FIG. 17).

A shaft body 220 is inserted through the center pipe 237, and fixed to both the right end wall 231 and the left end wall 232. Thereby, the shaft body 220 and the cylinder body 230 are configured to be rotatable in an integral manner. For example, the shaft body 220 is ϕ3, and is made of stainless steel. For example, an inside space of the housing body 210 containing the cylinder body 230 is a cylindrical space, and there is a gap space between the housing body 210 and the circumferential wall 233 of the cylinder body 230. The hosing body 210 is also made of stainless steel. On the other hand, an outer appearance of the housing body 210 is substantially quadrangular, and is made of (coated with) a PPS (polyphenylene sulfide) resin.

In particular, with reference to FIGS. 15 and 16, a left end of the inside space of the housing body 210 is defined by a left side lid member 247. The left side lid member 247 is a generally disc-shaped member, and is fitted onto an inside stepped surface of the housing body 210 via an O-ring 247a. In addition, the left side lid member 247 is provided with a through hole at a center thereof, through which the shaft body 220 is inserted. The through hole is sealed by an X-ring 247b while permitting the shaft body 220 to rotate.

Similarly, a right end of the inside space of the housing body 210 is defined by a right side lid member 257, The right side lid member 257 is a generally disc-shaped member, and is fitted onto another inside stepped surface of the housing body 210 via another O-ring 257a, In addition, the right side lid member 257 is provided with a through hole at a center thereof, through which the shaft body 220 is inserted. The through hole is sealed by another X-ring 257b while permitting the shaft body 220 to rotate.

In addition, in the housing body 210, there are provided a cold water supply channel, a hot water supply channel and a mixed water outlet channel, each of which is communicated with the inside space of the housing body 210, Specifically, the mixed water outlet channel is provided by a mixed water outlet port 215 which is integral with the housing body 210. The mixed water outlet port 215 is opened upward from the housing body 210, and is connected to a mixed water supply pipe 263 via an elbow-shaped connecting pipe 262.

In addition, the mixed water outlet port 215 is provided in such a size and position that the whole mixed water outlet hole 236 of the cylinder body 230 can be communicated with the mixed water outlet port 215 no matter which position and posture the cylinder body 230 is in within a movable range thereof.

On the other hand, the cold water supply channel of the present embodiment is provided by: a cold water supply pipe 211 which is removable from the housing body 210; and a cold water communication hole 212 which communicates an inside space of the cold water supply pipe 211 with the inside space of the housing body 210. The cold water supply pipe 211 is fitted in a connection port 211r provided in a lower surface of the housing body 210, via an O-ring. The cold water communication hole 212 has a circular cross-section shape on the side of the cold water supply pipe 211 and a rectangular cross-section shape on the side of the inside space of the housing body 210, the rectangular cross-section shape fitting within the circular cross-section shape.

Similarly, the hot water supply channel of the present embodiment is provided by: a hot water supply pipe 213 which is removable from the housing body 210; and a hot water communication hole 214 which communicates an inside space of the hot water supply pipe 213 with the inside space of the housing body 210. Similarly to the cold water supply pipe 211, the hot water supply pipe 213 is fitted in another connection port 213r provided in the lower surface of the housing body 210, via an O-ring. Similarly to the cold water communication hole 212, the hot water communication hole 214 has a circular cross-section shape on the side of the hot water supply pipe 213 and a rectangular cross-section shape on the side of the inside space of the housing body 210, the rectangular cross-section shape fitting within the circular cross-section shape. A lower side (an example of a one side) of a cold-water assist pipe member 216 is contained in the cold water communication hole 212. The cold-water assist pipe member 216 is slidable upward and downward in the cold water communication hole 212 depending on a water pressure difference between the lower side and an upper side (an example of the other side) thereof.

Specifically, a rubber packing 217 (a sealing member for cold water) is interposed between the cold water communication hole 212 and the cold-water assist pipe member 216, and the rubber packing 217 holds the cold-water assist pipe member 216 with respect to the cold water communication hole 212 in such a manner that the cold-water assist pipe member 216 is slidable upward and downward with respect to the cold water communication hole 212. When the cold-water assist pipe member 216 is slid upward, the upper side (an example of the other side) of the cold-water assist pipe member 216 can be brought into contact with the circumferential wall 233 of the cylinder body 230 and cab be communicated with the cold water inlet hole 234.

Figure 18:
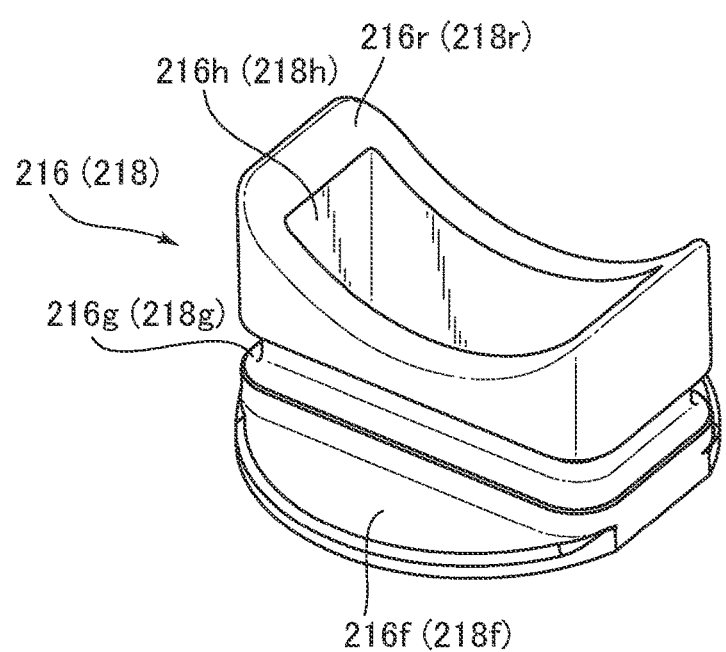
FIG. 18 is a schematic perspective view showing the cold-water assist pipe member according to the second embodiment of the present invention (the hot-water assist pipe member is similar)

FIG. 18 is a schematic perspective view showing the cold-water assist pipe member 216 of the present embodiment. As shown in FIG. 18, the cold-water assist pipe member 216 of the present embodiment has a flange part 216f as a movement regulating part, which regulates a movable (slidable) stroke of the cold-water assist pipe member 216 with respect to the inside wall of the cold water communication hole 212. The flange part 216f is contained in the region having the circular cross-section shape of the cold water communication hole 212 on the side of the cold water supply pipe 211. On the other hand, the flange part 216f has such a size that the flange part 216f cannot enter the region having the rectangular cross-section shape of the cold water communication hole 212. Thereby, when the flange part 216f is brought into abutment with the latter region, the movable (slidable) stroke of the cold-water assist pipe member 216 is regulated. In the present embodiment, the movable (slidable) stroke of the cold-water assist pipe member 216 is 1 mm. In addition, the cold-water assist pipe member 216 has a groove part 216g, on which the rubber packing 217 is fitted.

As shown in FIG. 18, at the time of shipment (prior to use), an upper surface 216r of the cold-water assist pipe member 216 is a part of a cylindrical surface having a curvature radius of 10 mm (which preferable range is between 5 mm and 15 mm). That is to say, the curvature radius is slightly greater than a curvature radius of the circumferential wall 233 of the cylinder body 230 (7.5 mm). Thereby, it can be avoided that only both ends of the upper surface 216r of the cold-water assist pipe member 216 in an arc direction thereof are brought into contact with the cylinder body 230 (which might be caused when the magnitude relationship between the above two curvature radiuses is opposite). That is to say, a situation is ensured in which a middle portion of the upper surface 216r of the cold-water assist pipe member 216 in the arc direction thereof is brought into contact with the cylinder body 230. Thereby, a more closely contact between the upper surface 216r of the cold-water assist pipe member 216 and the cylinder body 230 can be achieved.

Hardness of (at least the upper surface of) the cold-water assist pipe member 216 is smaller than that of the circumferential wall 233 of the cylinder body 230. Thus, it can be inhibited that the circumferential wall 233 of the cylinder body 230 is worn down in an undesired manner. On the other hand, it can be expected that the upper surface 216r of the cold-water assist pipe member 216 is worn down so as to align with (follow) the circumferential wall 233 of the cylinder body 230. This is preferable for the closely contact between the upper surface 216r of the cold-water assist pipe member 216 and the cylinder body 230. Herein, since the movable stroke of the cold-water assist pipe member 216 is regulated by the flange part 216f as a movement regulating part, it can be inhibited that the upper surface 216r of the cold-water assist pipe member 216 is worn down more than necessary.

The degree of hardness is judged by "Vickers hardness", which is obtained by a test defined in ISO 6507 (JIS Z 2244). The cold-water assist pipe member 216 of the present embodiment is made of a polyacetal resin, whose hardness is remarkably smaller than that of the circumferential wall 233 of the cylinder body 230 made of stainless steel.

Figure 19:
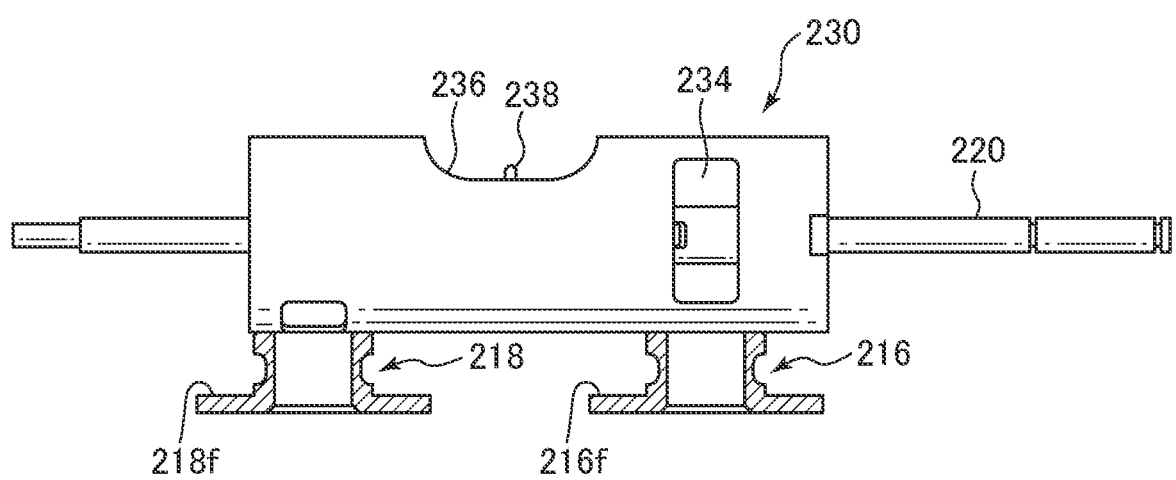
FIG. 19 is a schematic view showing a state in which the cold-water assist pipe member and the hot-water assist pipe member are in contact with the cylinder body according to the second embodiment of the present invention.

A pipe hole 216h of the cold-water assist pipe member 216 is provided in such a size and position (with respect to the axial direction of the housing body 210) that the whole cold water inlet hole 234 of the cylinder body 230 can be communicated with the pipe hole 216h in a situation in which a communication amount between the cold-water assist pipe member 216 and the cold water inlet hole 234 is controlled to be maximal (see FIGS. 19 and 20).

Similarly, a lower side (an example of a one side) of a hot-water assist pipe member 218 is contained in the hot water communication hole 214. The hot-water assist pipe member 218 is slidable upward and downward in the hot water communication hole 214 depending on a water pressure difference between the lower side and an upper side (an example of the other side) thereof. Specifically, a rubber packing 219 (a sealing member for hot water) is interposed between the hot water communication hole 214 and the hot-water assist pipe member 218, and the rubber packing 219 holds the hot-water assist pipe member 218 with respect to the hot water communication hole 214 in such a manner that the hot-water assist pipe member 218 is slidable upward and downward with respect to the hot water communication hole 214. When the hot-water assist pipe member 218 is slid upward, the upper side (an example of the other side) of the hot-water assist pipe member 218 can be brought into contact with the circumferential wall 233 of the cylinder body 230 and cab be communicated with the hot water inlet hole 235.

FIG. 18 is also a schematic perspective view showing the hot-water assist pipe member 218 of the present embodiment. As shown in FIG. 18, the hot-water assist pipe member 218 of the present embodiment also has a flange part 218f as a movement regulating part, which regulates a movable (slidable) stroke of the hot-water assist pipe member 218 with respect to the inside well of the hot water communication hole 214. The flange part 218f is contained in the region having the circular cross-section shape of the hot water communication hole 214 on the side of the hot water supply pipe 213. On the other hand, the flange part 218f has such a size that the flange part 218f cannot enter the region having the rectangular cross-section shape of the hot water communication hole 214. Thereby, when the flange part 218f is brought into abutment with the latter region, the movable (slidable) stroke of the hot-water assist pipe member 218 is regulated. In the present embodiment, the movable (slidable) stroke of the hot-water assist pipe member 218 is 5 mm. In addition, the hot-water assist pipe member 218 has a groove part 218g, on which the rubber packing 219 is fitted.

As shown in FIG. 18, at the time of shipment (prior to use), an upper surface 218r of the hot-water assist pipe member 218 is also a part of a cylindrical surface having a curvature radius of 10 mm (which preferable range is between 5 mm and 15 mm). That is to say, the curvature radius is slightly greater than a curvature radius of the circumferential wall 233 of the cylinder body 230 (7.5 mm). Thereby, it can be avoided that only both ends of the upper surface 218r of the hot-water assist pipe member 218 in an arc direction thereof are brought into contact with the cylinder body 230 (which might be caused when the magnitude relationship between the above two curvature radiuses is opposite). That is to say, a situation is ensured in which a middle portion of the upper surface 218r of the hot-water assist pipe member 218 in the arc direction thereof is brought into contact with the cylinder body 230. Thereby, a more closely contact between the upper surface 218r of the hot-water assist pipe member 218 and the cylinder body 230 can be achieved.

Hardness of (at least the upper surface of) the hot-water assist pipe member 218 is also smaller than that of the circumferential wall 233 of the cylinder body 230. Thus, it can be inhibited that the circumferential wall 233 of the cylinder body 230 is worn down in an undesired manner. On the other hand, it can be expected that the upper surface 218r of the hot-water assist pipe member 218 is worn down so as to align with (follow) the circumferential wall 233 of the cylinder body 230. This is preferable for the closely contact between the upper surface 218r of the hot-water assist pipe member 218 and the cylinder body 230. Herein, since the movable stroke of the hot-water assist pipe member 218 is regulated by the flange part 218f as a movement regulating part, it can be inhibited that the upper surface 218r of the hot-water assist pipe member 218 is worn down more than necessary.

The hot-water assist pipe member 218 of the present embodiment is also made of a polyacetal resin, whose hardness is remarkably smaller than that of the circumferential wall 233 of the cylinder body 230 made of stainless steel.

A pipe hole 218h of the hot-water assist pipe member 218 is provided in such a size and position that the whole hot water inlet hole 235 of the cylinder body 230 can be communicated with the pipe hole 218h in a situation in which a communication amount between the hot-water assist pipe member 218 and the hot water inlet hole 235 is controlled to be maximal (see FIG. 20).

As shown in FIGS. 12 to 15, an operation mechanism 240 is provided on a left side (on a one side in an axial direction) of the cylinder body 230. The operation mechanism 240 has an operation part 241 which is provided in a rotationally operable manner. In the present embodiment, the operation part 241 is a stepping motor configured to receive a control command from a control main unit (not shown) and to be driven to rotate by the control command.

In the present embodiment, the shaft body 220 and the cylinder body 230 are affected by a rotational operation of the operation part 241 in such a manner that a rotational position of the shaft body 220 and the cylinder body 230 is changed while an axial position of the shaft body 220 and the cylinder body 230 is not changed. Specifically, in particular as shown in FIG. 15, a rotation shaft (output shaft) 241s of the operation part 241 is fixed to a bottom part of a rotation cylinder 242 with respect to both an axial direction thereof and a rotation direction thereof. The rotation cylinder 242 is arranged such that the bottom part thereof is positioned on the left side. The rotation cylinder 242 is held in a housing cylinder 245 in a rotatable manner around an axis thereof.

The housing cylinder 245 holds a main part (a portion in a vicinity of the rotation shaft 241s) of the operation part 241 via a holding ring 244 on the left side thereof. In addition, the housing cylinder 245 is connected (fitted) to a left end part of the housing body 210 and the left side lid member 247 via a connection ring 246 on the right side thereof. The connection ring 246 is provided with a slide bearing (bush) 246b made of a resin at a center thereof, through which the shaft body 220 is inserted (see FIG. 16).

The rotation cylinder 242 is opened on the right side (opposite to the bottom part). A slider cylinder 243 is fitted in the rotation cylinder 242 in a slidable manner in an axial direction thereof. The rotation cylinder 242 and the slider cylinder 243 are fixed to each other with respect to a rotation direction thereof. For example, the slider cylinder 243 has four convex parts which protrude in a cross shape in an axial cross section thereof, and the rotation cylinder 242 has four concave parts which contain the four convex parts in a slidable manner in an axial direction thereof. That is to say, each of the four convex parts is contained in a corresponding one of the four convex parts. When the rotation cylinder 242 is rotated, the slider cylinder 243 is also rotated. When the slider cylinder 243 is rotated, the shaft body 220 and the cylinder body 230 are also rotated. On the other hand, the slider cylinder 243 is contained in the rotation cylinder 242 without being fixed to the rotation cylinder 242 with respect to the axial direction thereof. Thereby, even when the shaft body 220 is moved in the axial direction thereof, it is inhibited that the rotation cylinder 242 is moved in the axial direction thereof, or an axial moving force is not applied to the rotation cylinder 242 and thus the rotation cylinder 242 maintains an idling state of the movement in the axial direction thereof.

The slider cylinder 243 is fixed to a left end portion of the shaft body 220. Thereby, the slider cylinder 243 serves as a connection member, that is to say, the slider cylinder 243 is fixed to the rotation shaft 241s of the operation part 241 with respect to the rotational direction thereof, while the slider cylinder 243 is installed in such a manner that the slider cylinder 243 is movable against the rotation shaft 241s of the operation part 241 with respect to the axial direction thereof.

In the present embodiment, the operation part 241 is configured to provide a rotational operation up to 90°+α. A support mechanism 250 is provided on a right side (on the other side in the axial direction) of the cylinder body 230. The shaft body 220 and the cylinder body 230 are supported by the support mechanism 250 in such a manner that the shaft body 220 and the cylinder body 230 are rotatable while an axial position of the shaft body 220 and the cylinder body 230 is not changed. Specifically, a housing cylinder 255 is provided substantially symmetrically with the housing cylinder 245 in the left and right direction. The housing cylinder 255 holds a right end portion of the shaft body 220 via a pair of retaining rings 258. Thereby, the housing cylinder 255 and the shaft body 220 are fixed to each other with respect to an axial direction thereof, while being rotatable to each other.

In addition, the housing cylinder 255 is connected (fitted) to a right end part of the housing body 210 and the right side lid member 257 via a connection ring 256 on the left side thereof. The connection ring 256 is provided with a slide bearing (bush) 256b made of a resin at a center thereof, through which the shaft body 220 is inserted (see FIG. 16). According to this structure, both ends of the shaft body 220 in the present embodiment are located in a shielded region which is not communicated with the inside space of the housing body 210 and are exposed to an atmosphere (are not under a water pressure, but under the atmospheric pressure). Specifically, the left end of the shaft body 220 is shielded by the slide bearing (bush) 246b and the X-ring 247b in order not to be communicated with inside space of the housing body 210, and the right end of the shaft body 220 is shielded by the slide bearing (bush) 256b and the X-ring 257b in order not to be communicated with inside space of the housing body 210. According to this feature, an influence which a water pressure in the inside space of the housing body 210 has on the shaft body 220 is remarkably inhibited. Thus, a torque (force) required to cause the shaft body 220 (and the cylinder body 230) to rotate may be made smaller. That is to say, a torque required for the operation part 241 may be made smaller. It is further preferable that the shielded (sealed) parts of the shaft body 220 has the same diameter.

In addition, the housing body 210 has the left side lid member 247 and the right side lid member 257 in order to define the inside space thereof. By removing these lid members 247, 257, it is easy to assemble and/or disassemble (for example, for a maintenance operation) the structural elements in the housing body 210.

Furthermore, in the present embodiment, each of the lid members 247, 257 of the housing body 210 is located inner than a corresponding end portion of the housing body 210 in the axial direction thereof, which inhibits the length of the shaft body 220.

The faucet valve apparatus 200 of the present embodiment further includes a hot-water/cold-water stop unit which stops a supply of the hot water and/or the cold water. Specifically, the hot-water/cold-water stop unit has a cold-water stop unit 211s provided on an upstream side of the cold water supply channel, and a hot-water stop unit 213s provided on an upstream side of the hot water supply channel (see FIG. 13). Thereby, it can be prevented that one of the hot water and the cold water flows back to the upstream side of the other thereof.

Next, an operation of the faucet valve apparatus 200 of the present embodiment is explained. According to the above structure, the cylinder body 230 of the present embodiment is affected by a rotational operation of the operation part 241 in such a manner that the rotational position of the cylindrical body 230 is changed while the axial position of the cylindrical body 230 is not changed.

Depending on the rotational position of the cylinder body 230, the communication amount between the cold-water assist pipe member 216 (cold water supply channel) and the cold water inlet hole 234 and the communication amount between the hot-water assist pipe member 218 (hot water supply channel) and the hot water inlet hole 235 are changed. Thereby, a temperature regulation can be achieved. In the present embodiment, the mixed water outlet hole 236 and the mixed water outlet channel are always maintained to be well communicated with each other. FIG. 19 is a schematic view showing a state in which the cold-water assist pipe member 216 and the hot-water assist pipe member 218 are in contact with the cylinder body 230.

In addition, in the present embodiment, a ratio between the communication amount between the cold-water assist pipe member 216 (cold water supply channel) and the cold water inlet hole 234 and the communication amount between the hot-water assist pipe member 218 (hot water supply channel) and the hot water inlet hole 235 is changed by a rotational operation of the operation part 241 in order to achieve the temperature regulation.

FIGS. 20A to 20D are schematic explanatory views for a position control of the cylinder body 230 according to the present embodiment. In the present embodiment, the temperature regulation is achieved depending on the rotational position of the cylinder body 230.

Figure 20A:
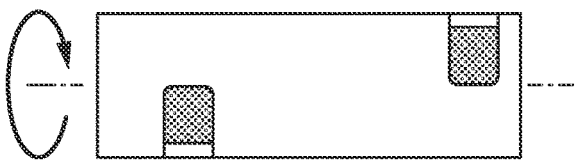
FIG. 20A is a schematic explanatory view showing a case in which the temperature regulation is achieved depending on the rotational position of the cylinder body.

FIG. 20A schematically shows the position of the cold water inlet hole 234 and the position of the hot water inlet hole 235 in the circumferential wall 233 of the cylinder body 230.

Figure 20B:
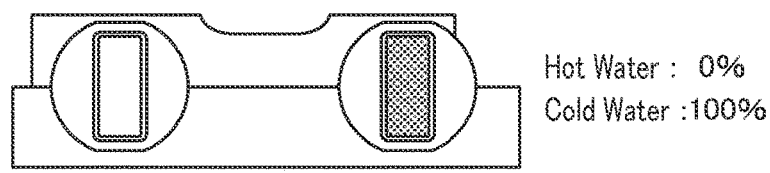
FIG. 20B is another schematic explanatory view showing the case in which the temperature regulation is achieved depending on the rotational position of the cylinder body.

FIG. 20B schematically shows a state in which the communication amount between the cold-water assist pipe member 216 (cold water supply channel) and the cold water inlet hole 234 is maximal while the communication between the hot-water assist pipe member 218 (hot water supply channel) and the hot water inlet hole 235 is interrupted. In this state, the mixed water supplied through the mixed water outlet hole 236 and the mixed water outlet channel consists of the cold water of 100% and the hot water of 0%.

Figure 20C:
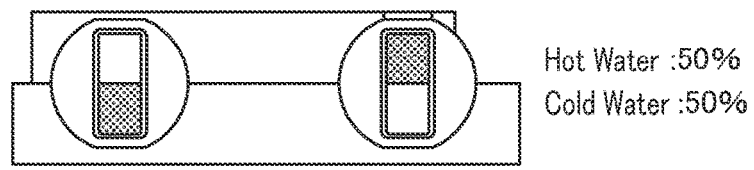
FIG. 20C is further another schematic explanatory view showing the case in which the temperature regulation is achieved depending on the rotational position of the cylinder body.

FIG. 20C schematically shows a state in which the rotational position of the shaft body 220 and the cylindrical body 230 has been changed by a rotational operation of the operation part 241 from the state shown in FIG. 203, and in which the communication amount between the cold-water assist pipe member 216 (cold water supply channel) and the cold water inlet hole 234 is 50% and the communication amount between the hot-water assist pipe member 218 (hot water supply channel) and the hot water inlet hole 235 is also 50%. In this state, the mixed water supplied through the mixed water outlet hole 236 and the mixed water outlet channel consists of the cold water of 50% and the hot water of 50%.

Figure 20D:
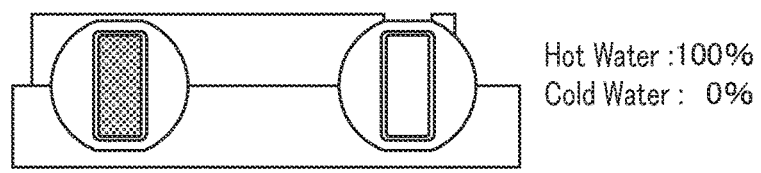
FIG. 20D is further another schematic explanatory view showing the case in which the temperature regulation is achieved depending on the rotational position of the cylinder body.

FIG. 20D schematically shows a state in which the rotational position of the shaft body 220 and the cylindrical body 230 has been changed by a rotational operation of the operation part 241 from the state shown in FIG. 20C, and in which the communication between the cold-water assist pipe member 216 (cold water supply channel) and the cold water inlet hole 234 is interrupted while the communication amount between the hot-water assist pipe member 218 (hot water supply channel) and the hot water inlet hole 235 is maximal. In this state, the mixed water supplied through the mixed water outlet hole 236 and the mixed water outlet channel consists of the cold water of 0% and the hot water of 100%.

As described above, according to the faucet valve apparatus 200 of the above embodiment, depending on the rotational position of the common cylinder body 230, the temperature regulation can be achieved. This makes it possible to design the faucet valve apparatus 200 of the above embodiment as a compact faucet valve apparatus.

In addition, according to the faucet valve apparatus 200 of the above embodiment, there is no obstacle in electrification of the operation part 241. That is to say, the faucet valve apparatus 200 of the above embodiment is suitable for achieving electrification of the temperature regulation.

In addition, the faucet valve apparatus 200 of the above embodiment is provided with the shaft body 220, which extends through the cylinder body 230 in the axial direction thereof and which is fixed (connected) to the cylinder body 230. Thereby, a control for changing the position of the cylinder body 230 can be achieved by a relatively simple structure which controls the position of the shaft body 220.

In addition, the faucet valve apparatus 200 of the above embodiment is provided with the slider cylinder 243 serving as a connection member, which is fixed (connected) to the left end portion of the shaft body 220 and which is fixed to the operation part 241 with respect to the rotational direction thereof while being movable against the operation part 241 with respect to the axial direction thereof. Thereby, a rotational operation of the operation part 241 can be surely transferred as a rotating force for the shaft body 220, while a force affected to the shaft body 220 in the axial direction thereof does not obstruct an operation of the operation part 241.

In addition, the faucet valve apparatus 200 of the above embodiment is provided with the support mechanism 250 serving as a holding member, which is configured to limit an axial movement of the right end portion of the shaft body 220 but not to limit a rotational movement of the right end portion of the shaft body 220. Thereby, while the axial movement of the right end portion of the shaft body 220 is limited, it is inhibited to obstruct the rotational movement of the shaft body 220 and thus the rotational operation of the operation part 241.

In addition, according to the faucet valve apparatus 200 of the above embodiment, the shaft body 220 extends through the cylinder body 230 in the axial direction thereof, and both the ends of the shaft body 220 are located in the region which is not communicated with the inside space of the housing body 210 and are exposed to the atmosphere. According to this feature, the influence which the water pressure in the inside space of the housing body 210 has on the shaft body 220 is remarkably inhibited. Thus, the torque (force) required to cause the shaft body 220 to rotate can be made smaller. This is very convenient for achieving the electrification.

In particular, according to the faucet valve apparatus 200 of the above embodiment, the left end of the shaft body 220 is shielded by the slide bearing (bush) 246*b* and the X-ring 247*b* in order not to be communicated with inside space of the housing body 210, and the right end of the shaft body 220 is shielded by the slide bearing (bush) 256*b* and the X-ring 257*b* in order not to be communicated with inside space of the housing body 210. Thereby, the influence which the water pressure in the inside space of the housing body 210 has on the shaft body 220 is inhibited extremely effectively. In addition, the shielded (sealed) parts of the shaft body 220 on both the right and left sides, which are shielded in order not to be communicated with inside space of the housing body 210, have the same diameter. Thus, the water pressured exerted on both the parts are canceled.

In addition, the faucet valve apparatus 200 of the above embodiment is provided with the left side lid member 247 and the right side lid member 257 in order to define the inside space of the housing body 210. Therefore, by removing the left side lid member 247 and/or the right side lid member 257, it is easy to assemble and/or disassemble (for example, for a maintenance operation) the structural elements in the housing body 210.

Furthermore, according to the faucet valve apparatus 200 of the above embodiment, each of the left side lid member 247 and the right side lid member 257 is located inner than a corresponding end portion of the housing body 210 in the axial direction thereof. Thus, the length of the shaft body 220 is inhibited. This is convenient for making the faucet valve apparatus 200 compact, In addition, according to the faucet valve apparatus 200 of the above embodiment, there is no elastic member (so-called packing), for example made of rubber, between the housing body 210 and the cylinder body 230, Instead, the housing body 210 and the cylinder body 230 are in a direct contact with each other so as to provide a certain sealing performance, which reduces a risk that an action (movement) of the cylinder body 230 in the housing body 210 is obstructed in an undesired manner. This also contributes to the effects that the torque (force) required to change the rotation position of the cylinder body 230 can be made smaller.

In addition, according to the faucet valve apparatus 200 of the above embodiment, depending on the water pressure difference between the one side of the cold-water assist pipe member 216 and the other side thereof, the cold-water assist pipe member 216 can be brought into contact with the circumferential wall 233 of the cylinder body 230 and cab be communicated with the cold water inlet hole 234. Similarly, depending on the water pressure difference between the one side of the hot-water assist pipe member 218 and the other side thereof, the hot-water assist pipe member 218 can be brought into contact with the circumferential wall 233 of the cylinder body 230 and cab be communicated with the hot water inlet hole 235. Thereby, the supply of the cold water into the cylinder body 230 and/or the supply of the hot water into the cylinder body 230 can be surely assisted, and it is unnecessary to interpose an elastic member, for example made of rubber, between the housing body 210 and the cylinder body 230. This also contributes to the effects that the torque (force) required to change the rotation position of the cylinder body 230 can be made smaller.

In addition, according to the faucet valve apparatus 200 of the above embodiment, the cold-water assist pipe member 216 has the movement regulating part (flange part 216*f*), which regulates the movable (slidable) stroke of the cold-water assist pipe member 216 with respect to the cold water supply channel; and the hot-water assist pipe member 218 has also the movement regulating part (flange part 218*f*), which regulates the movable (slidable) stroke of the hot-water assist pipe member 218 with respect to the hot water supply channel. Thereby, the movable (slidable) stroke of each of the cold-water assist pipe member 216 and the hot-water assist pipe member 218 is regulated within a desired range. That is to say, it is prevented that the cold-water assist pipe member 216 and/or the hot-water assist pipe member 218 moves (projects) toward the cylinder body 230 more than necessary.

In particular, according to the faucet valve apparatus 200 of the above embodiment, the movement regulating part of the cold-water assist pipe member 216 is provided as the flange part 216*f*, and the movement regulating part of the hot-water assist pipe member 218 is also provided as the flange part 218*f*. That is to say, these movement regulating parts are provided in a relatively simple manner.

In addition, according to the faucet valve apparatus 200 of the above embodiment, the hardness of the upper surface 216*r* of the cold-water assist pipe member 216 and the hardness of the upper surface 218*r* of the hot-water assist pipe member 218 are smaller than that of the circumferential wall 233 of the cylinder body 230. Thus, it is inhibited that the circumferential wall 233 of the cylinder body 230 is worn down in an undesired manner. On the other hand, it is preferable that the upper surface 216*r* of the cold-water assist pipe member 216 and the upper surface 218*r* of the hot-water assist pipe member 218 are rather worn down so as to align with (follow) the circumferential wall 233 of the cylinder body 230.

In particular, according to the faucet valve apparatus 200 of the above embodiment, the circumferential wall 233 of the cylinder body 230 is a cylindrical surface having a certain curvature radius (15 mm/2=7.5 mm), the upper surface 216*r* of the cold-water assist pipe member 216 is a part of a cylindrical surface having a certain curvature radius (10 mm), the upper surface 218*r* of the hot-water assist pipe member 218 is a part of a cylindrical surface having a certain curvature radius (10 mm), and the curvature radius of the upper surface 216*r* of the cold-water assist pipe member 216 and the curvature radius of the upper surface 218*r* of the hot-water assist pipe member 218 are greater than the curvature radius of the circumferential wall 233 of the cylinder body 230. Thereby, it is avoided that only both the ends of the upper surface 216*r* of the cold-water assist pipe member 216 in the arc direction thereof are brought into contact with the cylinder body 230 and only both the ends of the upper surface 218r of the hot-water assist pipe member 218 in the arc direction thereof are brought into contact with the cylinder body 230 (ensured is the situation in which the middle portion of the upper surface 216r of the cold-water assist pipe member 216 in the arc direction thereof is brought into contact with the cylinder body 230 and in which the middle portion of the upper surface 218r of the hot-water assist pipe member 218 in the arc direction thereof is also brought into contact with the cylinder body 230). Therefore, a more closely contact between the upper surface 216r of the cold-water assist pipe member 216 and the cylinder body 230 is achieved, and a more closely contact between the upper surface 218r of the hot-water assist pipe member 218 and the cylinder body 230 is also achieved.

In addition, the faucet valve apparatus 200 of the above embodiment is provided with the hot-water/cold-water stop unit, which stops the supply of the hot water and/or the cold water. Thereby, the supply of the hot water and/or the cold water can be surely stopped, even in a case wherein the supply is not perfectly stopped by regulating the flow rate to the minimum by means of the function of the achieved flow rate regulation (even in a case wherein a perfect sealing performance is not provided in the situation in which the communication has been controlled to be interrupted).

In particular, according to the faucet valve apparatus 200 of the above embodiment, the hot-water/cold-water stop unit consists of the cold-water stop unit 211s provided on the upstream side of the cold water supply channel, and the hot-water stop unit 213s provided on the upstream side of the hot water supply channel, so that it is prevented that one of the hot water and the cold water flows back to the upstream side of the other thereof.

What is claimed is:

1. A faucet valve apparatus comprising:
   a cylinder body having a hollow cylindrical shape;
   a cold water inlet hole, a hot water inlet hole and a mixed water outlet hole, each of which is formed in a circumferential wall of the cylinder body;
   a housing body containing the cylinder body in an axially movable and rotatable manner;
   a cold water supply channel, a hot water supply channel and a mixed water outlet channel, each of which is communicated with an inside space of the housing body;
   a first operation part provided on a one side in an axial direction of the cylinder body in a rotationally operable manner; and
   a second operation part provided on the other side in the axial direction of the cylinder body in a rotationally operable manner;
   wherein
   the cylinder body is affected by a rotational operation of the first operation part in such a manner that a rotational position of the cylinder body is changed while an axial position of the cylinder body is not changed,
   the cylinder body is affected by a rotational operation of the second operation part in such a manner that the axial position of the cylinder body is changed while the rotational position of the cylinder body is not changed,
   a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation, and
   the cylinder body affected by the rotational operation of the first operation part is the same as the cylinder body affected by the rotational operation of the second operation part.

2. The faucet valve apparatus according to claim 1, wherein
   a ratio between the communication amount between the cold water supply channel and the cold water inlet hole and the communication amount between the hot water supply channel and the hot water inlet hole is changed by a rotational operation of the first operation part in order to achieve the temperature regulation, and
   a total communication amount summed up by adding the communication amount between the cold water supply channel and the cold water inlet hole and the communication amount between the hot water supply channel and the hot water inlet hole is changed by a rotational operation of the second operation part in order to achieve the flow rate regulation.

3. The faucet valve apparatus according to claim 1, wherein
   a total communication amount summed up by adding the communication amount between the cold water supply channel and the cold water inlet hole and the communication amount between the hot water supply channel and the hot water inlet hole is changed by a rotational operation of the first operation part in order to achieve the flow rate regulation, and
   a ratio between the communication amount between the cold water supply channel and the cold water inlet hole and the communication amount between the hot water supply channel and the hot water inlet hole is changed by a rotational operation of the second operation part in order to achieve the temperature regulation.

4. A faucet valve apparatus comprising:
   a cylinder body having a hollow cylindrical shape;
   a cold water inlet hole, a hot water inlet hole and a mixed water outlet hole, each of which is formed in a circumferential wall of the cylinder body;
   a housing body containing the cylinder body in an axially movable and rotatable manner;
   a cold water supply channel, a hot water supply channel and a mixed water outlet channel, each of which is communicated with an inside space of the housing body;
   a first operation part provided on a one side in an axial direction of the cylinder body in a rotationally operable manner; and
   a second operation part provided on the other side in the axial direction of the cylinder body in a rotationally operable manner;
   wherein
   the cylinder body is affected by a rotational operation of the first operation part in such a manner that a rotational position of the cylinder body is changed while an axial position of the cylinder body is not changed,
   the cylinder body is affected by a rotational operation of the second operation part in such a manner that the axial position of the cylinder body is changed while the rotational position of the cylinder body is not changed,
   a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation, the first operation part and the second operation part are rotationally operable at the same time, and when the first operation part and the second operation part are rotationally operated at the same time, the cylinder body is affected thereby in such a manner the rotational position of the cylinder body is changed while the axial position of the cylinder body is changed.

5. A faucet valve apparatus comprising:
a cylinder body having a hollow cylindrical shape;
a cold water inlet hole, a hot water inlet hole and a mixed water outlet hole, each of which is formed in a circumferential wall of the cylinder body;
a housing body containing the cylinder body in an axially movable and rotatable manner;
a cold water supply channel, a hot water supply channel and a mixed water outlet channel, each of which is communicated with an inside space of the housing body;
a first operation part provided on a one side in an axial direction of the cylinder body in a rotationally operable manner;
a second operation part provided on the other side in the axial direction of the cylinder body in a rotationally operable manner; and
a shaft body which is affected by a rotational operation of the first operation part in such a manner that a rotational position of the shaft body is changed while an axial position of the shaft body is not changed and which is affected by a rotational operation of the second operation part in such a manner that the axial position of the shaft body is changed while the rotational position of the shaft body is not changed,
wherein
the cylinder body is affected by a rotational operation of the first operation part in such a manner that a rotational position of the cylinder body is changed while an axial position of the cylinder body is not changed,
the cylinder body is affected by a rotational operation of the second operation part in such a manner that the axial position of the cylinder body is changed while the rotational position of the cylinder body is not changed,
a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation, and
the cylinder body is connected to the shaft body.

6. The faucet valve apparatus according to claim 5, further comprising
a first connection member connected to or integrated with the shaft body and fixed to the first operation part with respect to a rotational direction thereof,
wherein
the first connection member is installed in such a manner that the first connection member is movable against the first operation part with respect to an axial direction thereof.

7. The faucet valve apparatus according to claim 6, further comprising
a direction conversion member configured to convert a rotational operating force of the second operation part to an axial moving force, and
a second connection member connected to or integrated with the shaft body and configured to receive the axial moving force converted by the direction conversion member,
wherein
the shaft body is installed in a rotatable manner with respect to the second connection member.

8. A faucet valve apparatus comprising:
a cylinder body having a hollow cylindrical shape;
a cold water inlet hole, a hot water inlet hole and a mixed water outlet hole, each of which is formed in a circumferential wall of the cylinder body;
a housing body containing the cylinder body in an axially movable and rotatable manner;
a cold water supply channel, a hot water supply channel and a mixed water outlet channel, each of which is communicated with an inside space of the housing body;
a first operation part provided on a one side in an axial direction of the cylinder body in a rotationally operable manner;
a second operation part provided on the other side in the axial direction of the cylinder body in a rotationally operable manner; and
a regulation member capable of regulating a rotatable range of the second operation part in a desired manner,
wherein
the cylinder body is affected by a rotational operation of the first operation part in such a manner that a rotational position of the cylinder body is changed while an axial position of the cylinder body is not changed,
the cylinder body is affected by a rotational operation of the second operation part in such a manner that the axial position of the cylinder body is changed while the rotational position of the cylinder body is not changed, and
a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation.

9. A faucet valve apparatus comprising:
a cylinder body having a hollow cylindrical shape;
a cold water inlet hole, a hot water inlet hole and a mixed water outlet hole, each of which is formed in a circumferential wall of the cylinder body;
a housing body containing the cylinder body in an axially movable and rotatable manner;
a cold water supply channel, a hot water supply channel and a mixed water outlet channel, each of which is communicated with an inside space of the housing body;
a first operation part provided on a one side in an axial direction of the cylinder body in a rotationally operable manner;
a second operation part provided on the other side in the axial direction of the cylinder body in a rotationally operable manner;

a shaft body connected to or integrated with the cylinder body;

a first connection member connected to or integrated with the shaft body and fixed to the first operation part with respect to a rotational direction thereof;

a direction conversion member configured to convert a rotational operating force of the second operation part to an axial moving force; and a second connection member connected to or integrated with the shaft body and configured to receive the axial moving force converted by the direction conversion member;

wherein the cylinder body is affected by a rotational operation of the first operation part in such a manner that a rotational position of the cylinder body is changed while an axial position of the cylinder body is not changed, the cylinder body is affected by a rotational operation of the second operation part in such a manner that the axial position of the cylinder body is changed while the rotational position of the cylinder body is not changed, a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation, the first connection member is installed in such a manner that the first connection member is movable against the first operation part with respect to an axial direction thereof, the cylinder body and the shaft body are affected by a rotation of the first connection member caused by a rotational operation of the first operation part in such a manner that a rotational position of the cylinder body and the shaft body is changed, and the cylinder body and the shaft body are affected by a conversion of a rotational operating force caused by a rotational operation of the second operation part into an axial moving force to be applied to the second connection member by the direction conversion member in such a manner that an axial position of the cylinder body and the shaft body is changed.

10. The faucet valve apparatus according to claim 9, wherein the first connection member is configured to move in an axial direction thereof in such a manner that a relative position thereof in the axial direction to the first operation part is changed when a rotational operating force of the second operation part is converted into an axial moving force to be applied to the cylinder body and the shaft body by the direction conversion member.

11. The faucet valve apparatus according to claim 9, wherein the shaft body is configured to be rotatable together with the first connection member against the second connection member when the first connection member rotates in accordance with a rotational operation of the first operation part.

12. A faucet valve apparatus comprising:
a cylinder body having a hollow cylindrical shape;
a cold water inlet hole, a hot water inlet hole and a mixed water outlet hole, each of which is formed in a circumferential wall of the cylinder body;

a housing body containing the cylinder body in an axially movable and rotatable manner;

a cold water supply channel, a hot water supply channel and a mixed water outlet channel, each of which is communicated with an inside space of the housing body;

a first operation part provided on a one side in an axial direction of the cylinder body in a rotationally operable manner;

a second operation part provided on the other side in the axial direction of the cylinder body in a rotationally operable manner; and a shaft body extending through the cylinder body in an axial direction thereof and connected to or integrated with the cylinder body, wherein the cylinder body is affected by a rotational operation of the first operation part in such a manner that a rotational position of the cylinder body is changed while an axial position of the cylinder body is not changed, the cylinder body is affected by a rotational operation of the second operation part in such a manner that the axial position of the cylinder body is changed while the rotational position of the cylinder body is not changed, a communication amount between the cold water supply channel and the cold water inlet hole, a communication amount between the hot water supply channel and the hot water inlet hole and/or a communication amount between the mixed water outlet hole and the mixed water outlet channel is changed depending on the axial position and the rotational position of the cylinder body in order to achieve both a temperature regulation and a flow rate regulation, both ends of the shaft body are located in a region which is not communicated with the inside space of the housing body and exposed to atmosphere, the cylinder body and the shaft body are affected by a rotational operation of the first operation part in such a manner that a rotational position of the cylinder body and the shaft body is changed, and the cylinder body and the shaft body are affected by a rotational operation of the second operation part in such a manner that an axial position of the cylinder body and the shaft body is changed.

13. The faucet valve apparatus according to claim 12, wherein the region in which both the ends of the shaft body are located is shielded by a sealing member in such a manner that the region is not communicated with inside space of the housing body.

14. The faucet valve apparatus according to claim 12, wherein both the ends of the shaft body are maintained to be exposed to the atmosphere even when the axial position of the shaft body is changed by a rotational operation of the second operation part.

15. The faucet valve apparatus according to claim 12, wherein the housing body has a lid member on a one side in an axial direction thereof and another lid member on the other side in the axial direction in order to define the inside space thereof.

16. The faucet valve apparatus according to claim 15, wherein each of the lid members of the housing body is located inner than a corresponding end portion of the housing body in the axial direction thereof.

17. The faucet valve apparatus according to claim 12, wherein
the housing body and the cylinder body are in a direct contact with each other in order to provide a certain sealing performance.

18. A faucet valve apparatus comprising:
a cylinder body having a hollow cylindrical shape;
a cold water inlet hole, a hot water inlet hole and a mixed water outlet hole, each of which is formed in a circumferential wall of the cylinder body;
a housing body containing the cylinder body in a rotatable manner;
a cold water supply channel, a hot water supply channel and a mixed water outlet channel, each of which is communicated with an inside space of the housing body;
an operation part provided on a one side in an axial direction of the cylinder body in a rotationally operable manner; and
a shaft body extending through the cylinder body in an axial direction thereof and connected to or integrated with the cylinder body;
wherein
both ends of the shaft body are located in a region which is not communicated with the inside space of the housing body and exposed to atmosphere,
the cylinder body and the shaft body are affected by a rotational operation of the operation part in such a manner that a rotational position of the cylinder body and the shaft body is changed, and
a communication amount between the cold water supply channel and the cold water inlet hole, a communication amount between the hot water supply channel and the hot water inlet hole and/or a communication amount between the mixed water outlet hole and the mixed water outlet channel is changed depending on the rotational position of the cylinder body in order to achieve a temperature regulation.

19. The faucet valve apparatus according to claim 18, wherein
the region in which both the ends of the shaft body are located is shielded by a sealing member in such a manner that the region is not communicated with inside space of the housing body.

20. The faucet valve apparatus according to claim 18, further comprising
a connection member connected to or integrated with one end portion of the shaft body and fixed to the operation part with respect to a rotational direction thereof,
wherein
the connection member is arranged in such a manner that the connection member is movable against the operation part with respect to an axial direction thereof.

21. The faucet valve apparatus according to claim 20, further comprising
a holding member configured to limit an axial movement of the other end of the shaft body but not to limit a rotational movement of the other end of the shaft body.

22. The faucet valve apparatus according to claim 18, wherein
the housing body has a lid member on a one side in an axial direction thereof and another lid member on the other side in the axial direction in order to define the inside space thereof.

23. The faucet valve apparatus according to claim 22, wherein
each of the lid members of the housing body is located inner than a corresponding end portion of the housing body in the axial direction thereof.

* * * * *